(12) United States Patent
Gentner et al.

(10) Patent No.: US 10,717,332 B2
(45) Date of Patent: Jul. 21, 2020

(54) TRAILER DEVICE

(71) Applicant: ACPS Automotive GmbH, Markgroeningen (DE)

(72) Inventors: Wolfgang Gentner, Steinheim (DE); Bernhard Rimmelspacher, Rheinstetten (DE); Aleksej Kadnikov, Leonberg (DE)

(73) Assignee: ACPS Automotive GmbH, Markgroeningen (DE)

( * ) Notice: Subject to any disclaimer, the term of this patent is extended or adjusted under 35 U.S.C. 154(b) by 204 days.

(21) Appl. No.: 15/492,471

(22) Filed: Apr. 20, 2017

(65) Prior Publication Data

US 2017/0305219 A1    Oct. 26, 2017

(30) Foreign Application Priority Data

Apr. 20, 2016   (DE) .......................... 10 2016 107 302

(51) Int. Cl.
*B60D 1/54*    (2006.01)
*B60D 1/06*    (2006.01)

(52) U.S. Cl.
CPC ................. *B60D 1/54* (2013.01); *B60D 1/06* (2013.01); *B60D 2001/544* (2013.01)

(58) Field of Classification Search
CPC ....... B60D 1/54; B60D 1/06; B60D 2001/544
USPC ...................................................... 280/498
See application file for complete search history.

(56) References Cited

U.S. PATENT DOCUMENTS

| 3,521,908 | A | * | 7/1970 | Carter | ...................... | B60D 1/40 280/479.1 |
| 5,009,446 | A | * | 4/1991 | Davis | ...................... | B60D 1/40 280/477 |
| 5,213,354 | A | * | 5/1993 | Vaughn | ................... | B60D 1/40 280/477 |
| 5,375,867 | A | * | 12/1994 | Kass | ........................ | B60D 1/06 280/406.2 |

(Continued)

FOREIGN PATENT DOCUMENTS

DE   10 2014 116 000 A1   5/2016

*Primary Examiner* — Jacob D Knutson
(74) *Attorney, Agent, or Firm* — Reinhart Boerner Van Deuren P.C.

(57) ABSTRACT

In order to improve a trailer device for motor vehicles, comprising a crossmember, which is mountable on a vehicle body at the rear-end side thereof, a holding unit, which is provided on the crossmember and which carries a ball neck receiving body comprising a ball neck receptacle, into which receiving body an insertion portion of a ball neck supporting a coupling ball is insertable and fixable therein, in such a way that the ball neck receiving body is both visible and intrusive to the least possible extent when the ball neck is not inserted, it is proposed that the holding unit comprises a pivot bearing unit, by means of which the ball neck receiving body is movable from a working position, in which the ball neck is insertable into said receiving body for trailer operation, into a rest position, and that at least one stop element fixedly connected to the holding unit is provided, which stop element has a first support surface, which, in the working position, abuts against the insertion portion with the insertion portion inserted into the ball neck receptacle and thus blocks a pivoting of the ball neck receiving body in at least one pivot direction.

52 Claims, 19 Drawing Sheets

(56) References Cited

U.S. PATENT DOCUMENTS

| | | | | |
|---|---|---|---|---|
| 5,465,991 A | * | 11/1995 | Kass | B60D 1/06 280/406.2 |
| 7,052,032 B1 | | 5/2006 | Adair | |
| 7,093,845 B1 | * | 8/2006 | Fast | B60D 1/50 280/489 |
| 7,255,362 B2 | * | 8/2007 | Smith | B60D 1/46 280/462 |
| 2016/0159177 A1 | * | 6/2016 | Rimmelspacher | B60D 1/06 280/491.3 |

* cited by examiner

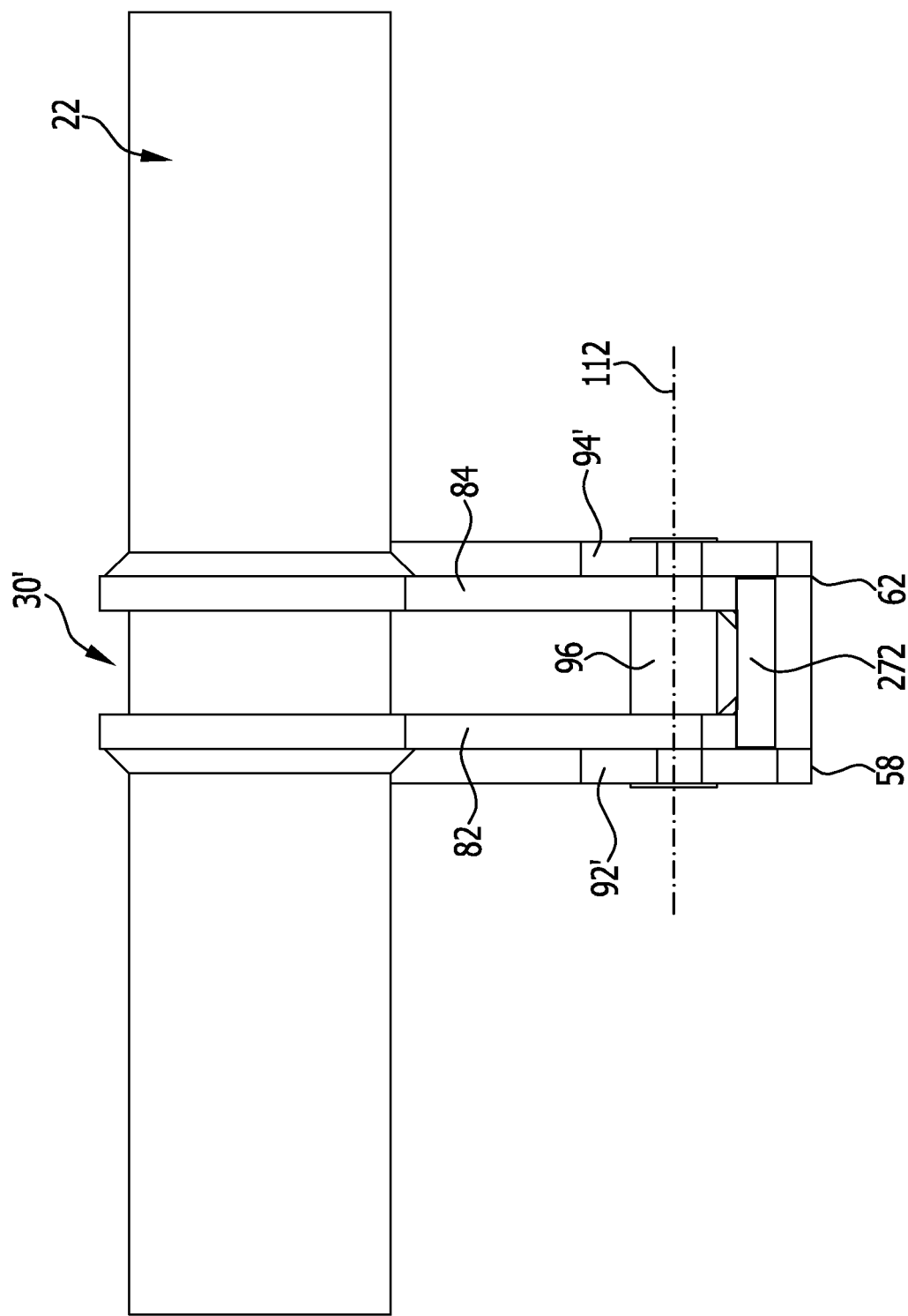

TRAILER DEVICE

CROSS-REFERENCE TO RELATED PATENT APPLICATION

This patent application claims the benefit of German application No. 10 2016 107 302.4, filed Apr. 20, 2016, the teachings and disclosure of which are hereby incorporated in their entirety by reference thereto.

BACKGROUND OF THE INVENTION

The invention relates to a trailer device for motor vehicles, comprising a crossmember which is mountable on a vehicle body on the rear-end side thereof, a holding unit, which is provided on the crossmember and which carries a ball neck receiving body comprising a ball neck receptacle, into which receiving body an insertion portion of a ball neck supporting a coupling ball is insertable and fixable therein.

Such trailer devices are known from the prior art.

In the case of these known trailer devices there is the problem that the ball neck receiving body is arranged in a stationary manner and therefore is constantly visible when the insertion portion of the ball neck is not inserted in said receiving body.

The problem addressed by the invention is therefore that of improving a trailer device of the type in question such that the ball neck receiving body is both visible and intrusive to the least possible extent when a ball neck is not inserted.

SUMMARY OF THE INVENTION

This problem is achieved in accordance with the invention in the case of a trailer device of the type described in the introduction in that the holding unit comprises a pivot bearing unit, by means of which the ball neck receiving body is movable from a working position, in which the ball neck is insertable into said receiving body for trailer operation, into a rest position, and in that at least one stop element fixedly connected to the holding unit is provided, which stop element has a first support surface, which, in the working position, abuts against the insertion portion when the insertion portion is inserted into the ball neck receptacle and thus blocks a pivoting of the ball neck receiving body in at least one pivot direction.

The advantage of the solution according to the invention is thus considered to be that on the one hand the ball neck receiving body can be moved from the working position into a rest position by the pivot bearing unit, and yet on the other hand it is possible to block the ball neck receiving body with the insertion portion inserted thereinto against a pivoting of the ball neck receiving body in at least one pivot direction and to thus maintain the working position when the insertion portion is inserted into the ball neck receiving body, wherein the blocking of the pivot motion is achieved in particular by the direct cooperation of the first support surface and the insertion portion, without the use of further elements.

It is particularly favourable if, when the insertion portion is inserted into the ball neck receiving body in the working position, the first support surface of the stop element blocks a pivot motion from the working position into the rest position and thus provides the possibility to prevent the pivot motion from the working position into the rest position already as a result of the mere insertion of the insertion portion into the ball neck receiving body.

The effect of the first support surface is particularly efficient when the first support surface is arranged at a spacing from the pivot bearing unit, in particular at a spacing from a pivot axis of the pivot bearing unit.

No further details have been provided previously in respect of the orientation of the first support surface.

An advantageous solution provides that the first support surface extends in the working direction in a direction parallel to the central axis of the ball neck receptacle and thus is placeable easily against the insertion portion. It is furthermore likewise also favourable if the first support surface extends in a direction transverse to the pivot direction to be blocked.

A solution of particularly simple design provides that the first support surface, in the working position, forms a partial region of a wall surface bordering the ball neck receptacle.

It is also preferably provided that the first support surface, in the working position, delimits at least one portion of the ball neck receptacle.

In conjunction with the previously explained embodiments, there are no further details provided specifying on which side of the ball neck receptacle the first support surface is arranged.

The first support surface is preferably arranged on a side of the ball neck receptacle facing towards the pivot bearing unit and thus can be easily used in order to block the at least one pivot motion.

It is also expediently provided that the first support surface, in the working position, abuts against a side of the insertion portion facing towards the pivot bearing unit and is thus easily able to block a pivot motion of the unit formed of ball neck receiving body and insertion portion.

In particular in all the cases in which the first support surface serves to block a pivot motion from the working position in the direction of the rest position, it is particularly advantageous if at least one further stop element is fixedly connected to the holding unit and blocks a pivot motion from the rest position in the direction of the working position, in the working position, and thus prevents the pivot motion from the rest position in the direction of the working position from being performed beyond the working position.

This can be achieved in particular when a pivot stop fixedly connected to the ball neck receiving body abuts against the at least one further stop element in the working position.

With regard to the arrangement of the pivot stop connected to the ball neck receiving body, a wide range of different solutions are conceivable.

The pivot stop can be connected to the ball neck receiving body in principle by any connection elements.

An advantageous solution provides that the at least one pivot stop is arranged on at least one bearing element of the ball neck receiving body, such that the bearing element constitutes the connection between the pivot stop and the ball neck receiving body.

Another advantageous solution provides that the pivot stop is arranged on the ball neck receiving body.

A particularly simple solution provides that the ball neck receiving body itself forms the pivot stop.

It is also expediently provided that a second support surface in the working position when the insertion portion is inserted into the ball neck receptacle abuts against the insertion portion and thus blocks a pivot motion of the ball neck receiving body in a pivot direction from the rest position in the direction of the working position, in the working position, and thus prevents the ball neck receiving body from moving beyond the working position in this pivot direction.

A structurally particularly favourable solution provides that a stop element is fixedly connected to the holding unit, which stop element comprises the second support surface, which in the working position forms a partial region of a wall surface of the ball neck receptacle encompassing the ball neck receptacle.

No further details have been provided previously with regard to the arrangement of the stop element in the rest position relative to the ball neck receptacle.

For a simple structural design, it is advantageous if the stop element, in the rest position, engages in the ball neck receptacle such that the stop element, when the ball neck receiving body moves from the working position into the rest position, does not collide with this movement of the ball neck receiving body.

In this case it is expediently also provided that the first support surface, in the rest position, extends transversely to a central axis of the ball neck receptacle, and therefore the ball neck receptacle is also movable, collision-free, relative to the first support surface.

With regard to the design of the ball neck receiving body itself, no further details have been provided in conjunction with the previous explanation of the solution according to the invention.

An advantageous solution thus provides that the ball neck receiving body is formed as a receiving sleeve which has a through opening into which the stop element extends to such an extent that, in the working position, the support surface contacts the insertion portion and for example the support surface at the same time forms a partial region of a transverse wall surface delimiting the ball neck receptacle.

The blocking effect of the support surface in the working position is thus ensured if the ball neck is inserted by means of its insertion portion into the ball neck receptacle.

Another advantageous solution provides that the ball neck receiving body is U-shaped at least in part and has an open side, in which the first and/or second support surface lies in the working position of the ball neck receiving body.

With this solution a blocking of the pivot motion of the ball neck receiving body can be provided, likewise in a simple manner, by the corresponding support surface.

A blocking of the at least one pivot motion or both pivot motions can then be provided particularly favourably by the first and/or second support surface if the open side of the ball neck receiving body faces towards the pivot bearing unit in the working position.

Structurally, this solution can be implemented particularly easily in that, in the working position, the first and/or second support surface lie/lies between side wall surfaces of the at least one partially U-shaped ball neck receiving body.

The blocking effect is particularly favourable if, in the working position, the insertion portion of the ball neck inserted into the ball neck receptacle is supported on the first and/or second support surface by means of a side facing towards the pivot bearing unit, in particular the pivot axis, such that the blocking effect thus can be attained in a simple manner.

No further details have been specified previously with regard to the embodiment of the pivot bearing unit by means of which the ball neck is pivotable from a working position, in which the ball neck is insertable for trailer operation, into a rest position.

An advantageous solution thus provides that, in the working position, a central axis of the ball neck receptacle has a substantially horizontal course when the motor vehicle is standing on a horizontal roadway, such that the insertion portion thus is insertable into the ball neck receptacle in a simple manner.

A substantially horizontal course is understood to be a course with a deviation of up to 20° from a horizontal course.

It is advantageously also provided that in the rest position a central axis of the ball neck receptacle has a substantially vertical course when the motor vehicle is standing on a horizontal roadway so as to thus be able to move the ball neck receiving body out from the field of view.

A substantially vertical course is understood to mean a course with a deviation of up to 20° from a vertical course.

In the solution according to the invention it is structurally favourable, on account of the simplicity, if the pivot bearing unit enables a pivoting of the ball neck receiving body about a pivot axis.

Here, the pivot axis preferably runs transversely to a vehicle longitudinal direction.

The pivot axis preferably runs parallel to the crossmember.

With regard to the design of the pivot bearing unit, it is preferably provided that the ball neck receiving body is pivotable about a single pivot axis, such that the pivot bearing unit can be designed in a particularly simple manner.

There have also been no further details provided in respect of the arrangement of the pivot axis relative to the ball neck receiving body.

It is preferably provided that the pivot axis of the pivot bearing unit, in the working position, lies, in the direction of the force of gravity, above a partial region of the ball neck receiving body adjacent to the insertion opening.

It is particularly favourable here if the partial region, starting from the insertion opening, extends over at most half of the extent of the ball neck receiving body in the direction of the central axis.

There have also been no further details provided previously with regard to the specific embodiment of the pivot bearing unit.

An expedient solution provides that the pivot bearing unit comprises bearing elements arranged on the ball neck receiving body, which are mounted on side parts of the holding unit by means of a pivot bearing so as to be pivotable about the pivot axis.

There has also been no detailed information provided previously with regard to the pivot motion of the ball neck receiving body relative to the holding unit.

An advantageous solution provides that the holding unit comprises a pivot bearing unit by means of which the ball neck receiving body is raisable from a working position, in which the ball neck is insertable into said receiving body for trailer operation, into a rest position, in which an insertion opening of the ball neck receiving body is arranged outside the field of view as a result of the raising of the ball neck receiving body.

With regard to the rest position it is particularly advantageous if the ball neck receiving body is arranged higher in the rest position than in the working position as considered in the direction of the force of gravity.

In particular it is provided that the ball neck receiving body is arranged in front of the pivot axis in the rest position, as considered in the direction of forward travel of the motor vehicle, so as to be able to position the ball neck receiving body in an advantageous and space-saving manner.

With regard to the positioning of the ball neck receiving body in the rest position, it is also provided that in the rest position, this is arranged, in the direction of the force of gravity, above a plane which runs parallel to the roadway through the central axis of the ball neck receptacle in the working position.

It is also advantageous if, in the rest position, a region of the ball neck receiving body forming the insertion opening, in particular an end face of the ball neck receiving body, is the lowest region of said receiving body in the direction of the force of gravity.

In particular, it is also provided in the rest position that the insertion opening of the ball neck receiving body faces towards a roadway.

A further solution with an advantageous position of the ball neck receiving body in the rest position provides that the ball neck receiving body, in the rest position, protrudes downwardly beyond the holding unit in the direction of the force of gravity by at most a quarter of the extent of said receiving body transverse to the central axis.

It is also preferably provided that the ball neck receiving body, in the rest position, is arranged on a vehicle body, in particular on a side of the pivot axis facing towards a rear-end region of the vehicle body.

A particularly favourable positioning of the ball neck receiving body in the rest position is then possible if the ball neck receiving body is arranged in the rest position in a manner engaging in a receiving space of the holding unit.

Here, the receiving space is preferably arranged between the side parts of the holding unit.

There have also been no further specific details provided with regard to the arrangement of the ball neck receiving body in the working position.

An advantageous solution provides that the ball neck receiving body, in the working position, is arranged below the pivot axis in the direction of the force of gravity.

In particular, it is favourable here if the ball neck receiving body, in the working position and in the direction of the force of gravity, is arranged below a plane defined by a lower edge of the bumper unit and parallel to the roadway.

There have also been no further details provided with regard to a fixing of the ball neck receiving body in the rest position.

A locking device is preferably provided, which fixes the ball neck receiving body relative to the holding unit in the rest position.

By way of example, the locking device is formed here such that it comprises two locking elements, of which one is connected to the holding unit and one is connected to the ball neck receiving body.

By way of example, at least one of the locking elements is formed as a swivel latch, which in the locked position fixes a latch member forming the other of the locking elements.

There have also been no further details provided previously with regard to the execution of the pivot motions of the ball neck receiving body.

An advantageous solution provides that the pivot motion from the working position into the rest position is performed by manual operation.

However, it is also conceivable to perform the pivot motion between the working position and the rest position in a motor-driven manner.

With regard to the pivot motion from the rest position into the working position, it is preferably provided that this is performed at least in a manner assisted and/or driven by the force of gravity.

In addition, the invention relates to a motor vehicle having a trailer device, wherein the trailer device is formed in accordance with the invention in accordance with one of the above-mentioned combinations of features.

Further features and advantages are the subject of the following description and illustration in the drawings of a number of exemplary embodiments.

BRIEF DESCRIPTION OF THE DRAWINGS

FIG. 19 shows a plan view from above of the third exemplary embodiment of the trailer coupling according to the invention in the rest position in the vertical direction corresponding to the arrow D in FIG. 16.

DETAILED DESCRIPTION OF THE INVENTION

Figure 1:
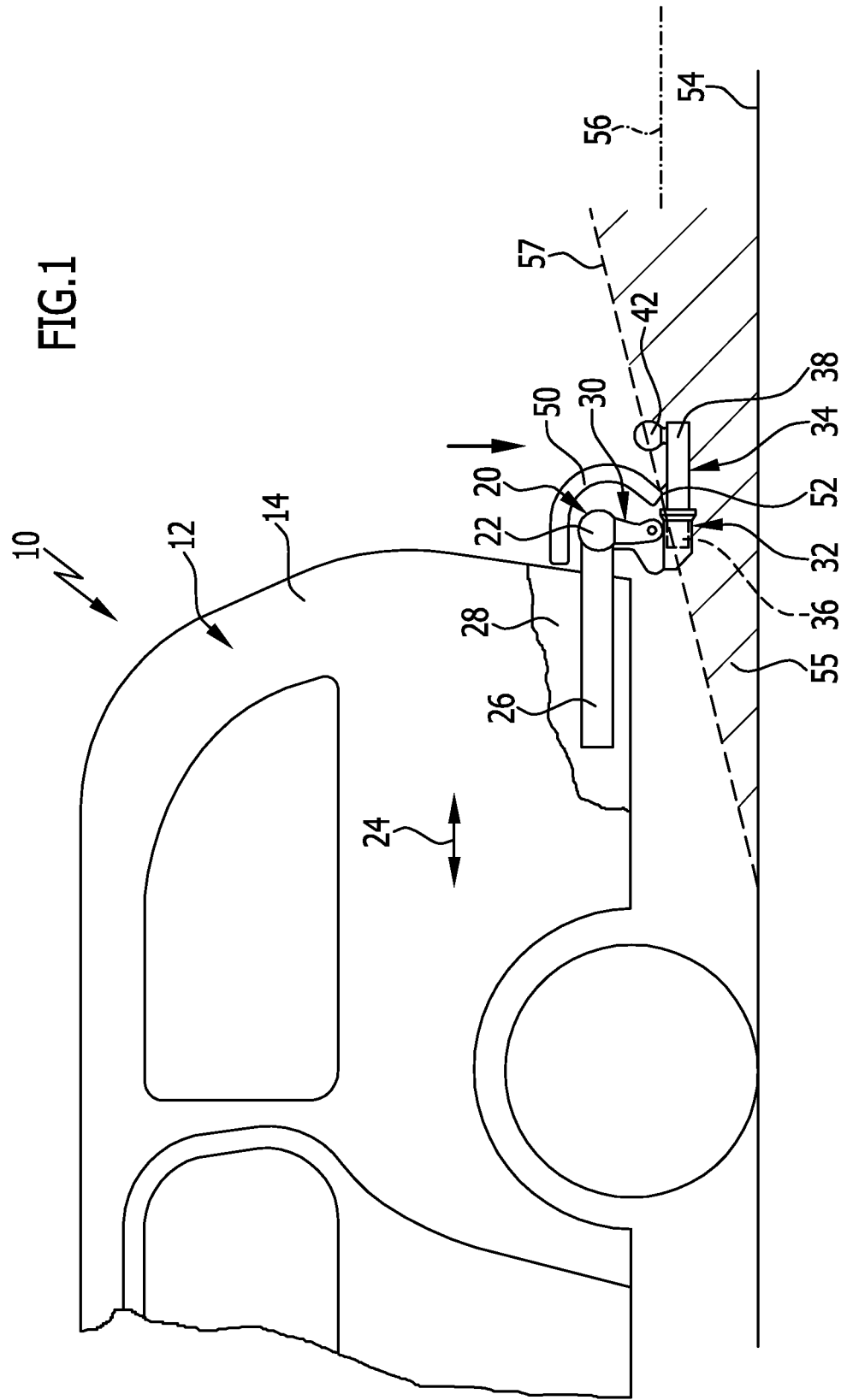
FIG. 1 shows a schematic side view of a motor vehicle with a first exemplary embodiment of a trailer device according to the invention in the working position.

A motor vehicle denoted as a whole by 10 in FIG. 1 comprises a vehicle body 12, on which there is mounted, in a rear-end region 14, a trailer device 20 according to the invention.

The trailer device 20 comprises a crossmember 22, which extends transversely to a vehicle longitudinal direction 24 and for example is connected to the rear-end region 14 of the vehicle body 12 by means of sidemembers 26 extending parallel to the vehicle longitudinal direction 24 at body portions 28 likewise extending in the vehicle longitudinal direction 24.

A holding unit denoted as a whole by 30 is provided on the crossmember 22 and carries a ball neck receiving body denoted as a whole by 32.

A ball neck denoted as a whole by 34 is insertable into this ball neck receiving body 32 by means of an insertion portion 36, which forms one end of the ball neck 34, whereas another, opposite end 38 of the ball neck 34, protruding beyond the ball neck receiving body 32, carries a coupling ball 42.

Figure 2:
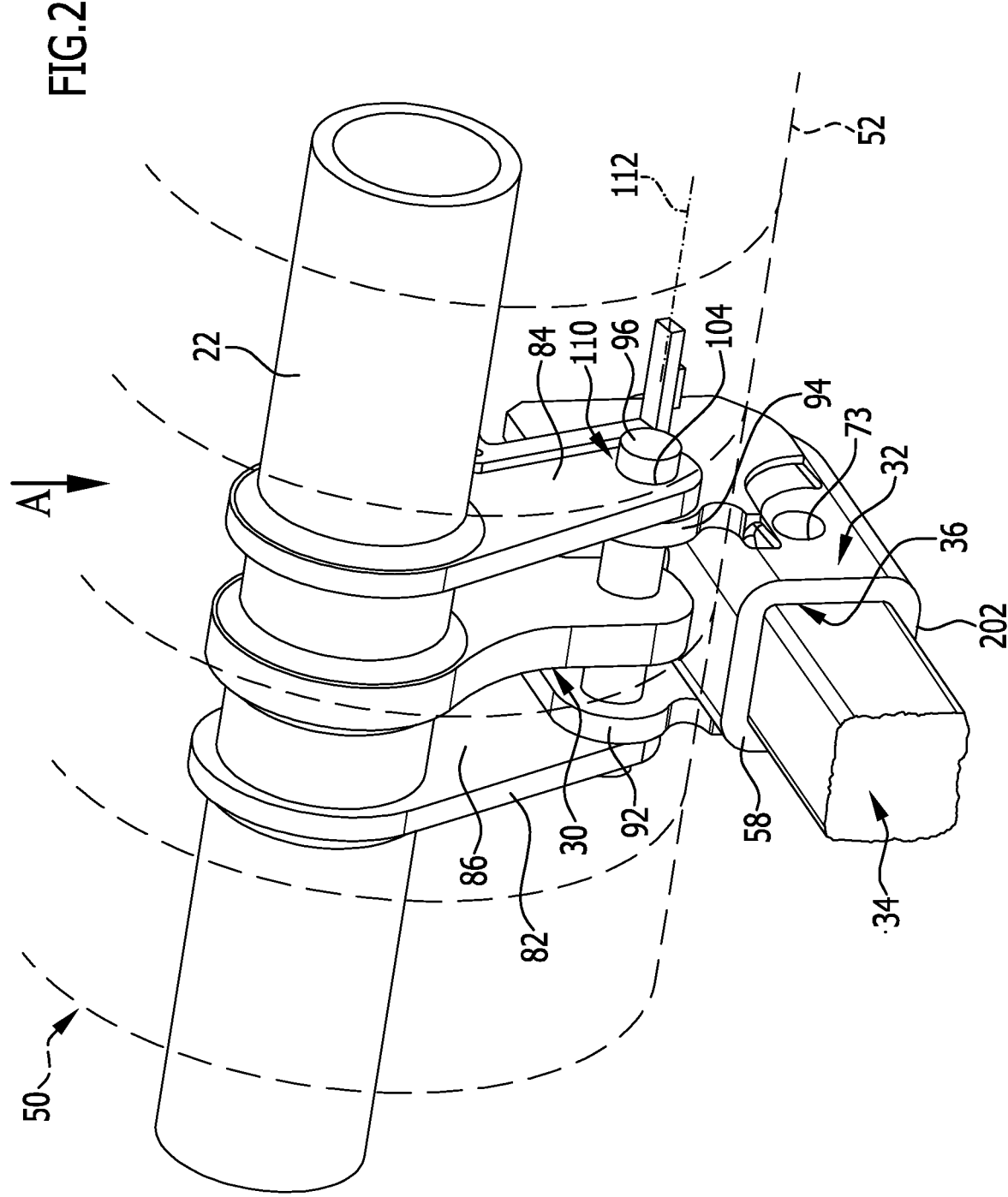
FIG. 2 shows a perspective illustration of the first exemplary embodiment of the trailer device according to the invention with merely schematically indicated bumper unit in the working position from the rear right.

In the case of a motor vehicle 10 according to the invention, the crossmember 22, end portions of the sidemember 26 for example holding the crossmember 22, and the holding unit 30 are preferably covered by a bumper unit 50 of the body, which extends over the crossmember 22 on an upper side facing away from a roadway 54 and on a rear side facing away from the rear-end region 14 of the body 12, and which also extends over the holding unit 30 on the upper side thereof facing away from the roadway 54 and on the side thereof facing away from the rear-end region 14, such that, when the vehicle body 12 is observed from the rear, merely the ball neck receiving body 32 below a lower edge 52 of the bumper unit 50 and below a plane 56 running parallel to the roadway 54 and through the lower edge 52 lies in a field of view 55 in the working position of said receiving body, such that, in the working position, as is illustrated in particular in FIG. 2, an insertion opening 62 lying on an end face 58 of the ball neck receiving body 32 is visible, which insertion opening is preferably surrounded by a reinforcement collar 64 of the ball neck receiving sleeve 32.

The field of view 55 is delimited here by a line of sight 57, which is inclined at 15° relative to the roadway 54 and contacts the lower edge 52 of the bumper unit 50, and lies beneath said lower edge of the bumper unit.

Starting from the insertion opening 62, a ball neck receptacle 66 extends into the ball neck receiving body 32 having a sleeve-like basic shape, wherein the ball neck receptacle 66 preferably has a rectangular or square cross-sectional shape.

In the working position of the ball neck receptacle 66 illustrated in FIG. 1 to FIG. 6, a central axis 68 of the ball neck receptacle 66 preferably runs approximately parallel to the direction of travel 24 and also approximately horizontally when the motor vehicle 10 is standing on a horizontal roadway 54.

Here, "approximately parallel and approximately horizontally" is understood to mean a deviation of up to 20° from an exact parallel or an exact horizontal.

The ball neck receiving body 32 in particular has mutually opposed side walls 72 and 74 and also transverse walls 76 and 78 connecting the side walls, wherein in particular the side walls 72 and 74 and the transverse walls 76 and 78 in each case run parallel to the central axis 68.

Figure 3:
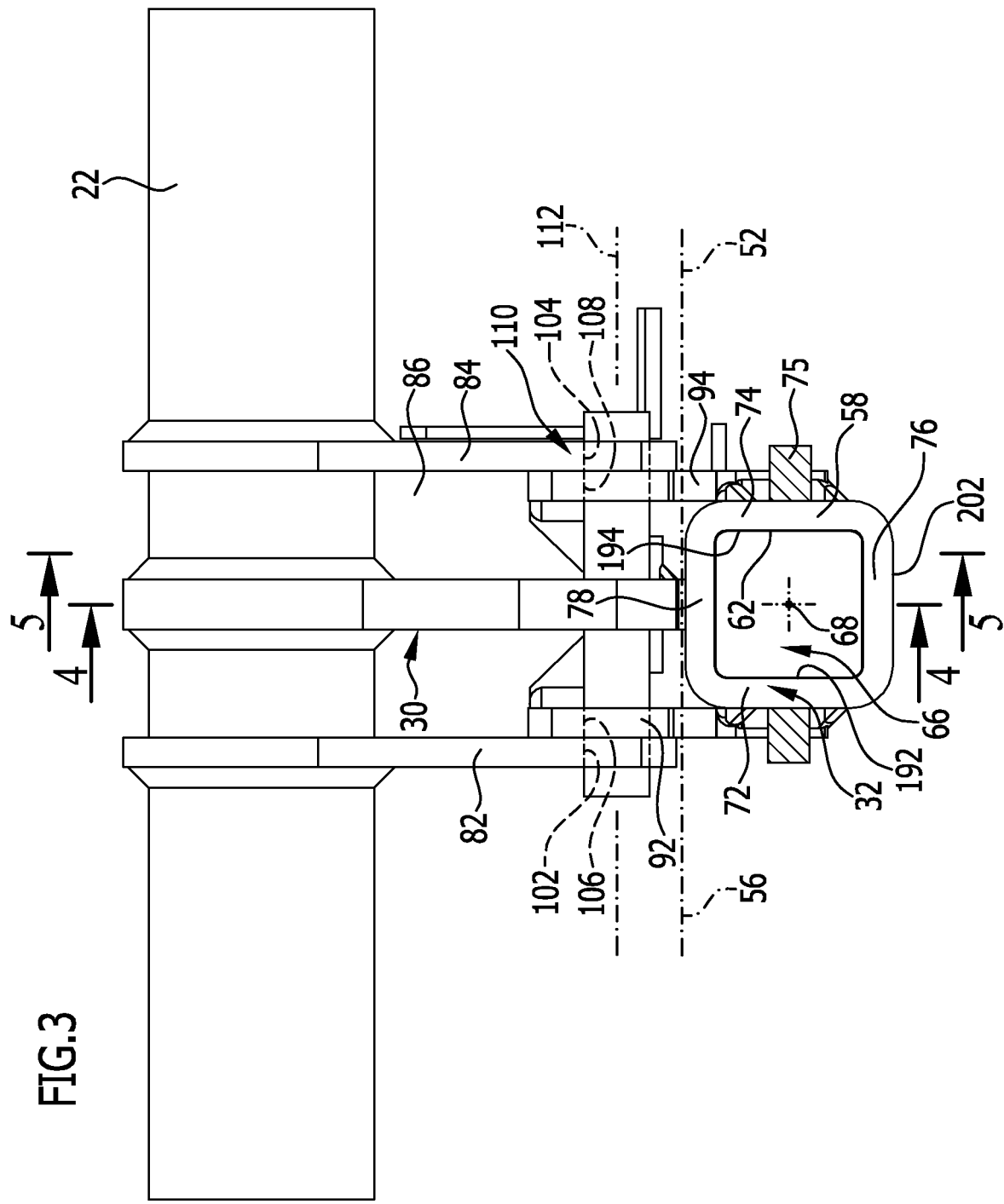
FIG. 3 shows a view of the first exemplary embodiment of the trailer device according to the invention from a rear side of the vehicle in the working position.
Figure 4:
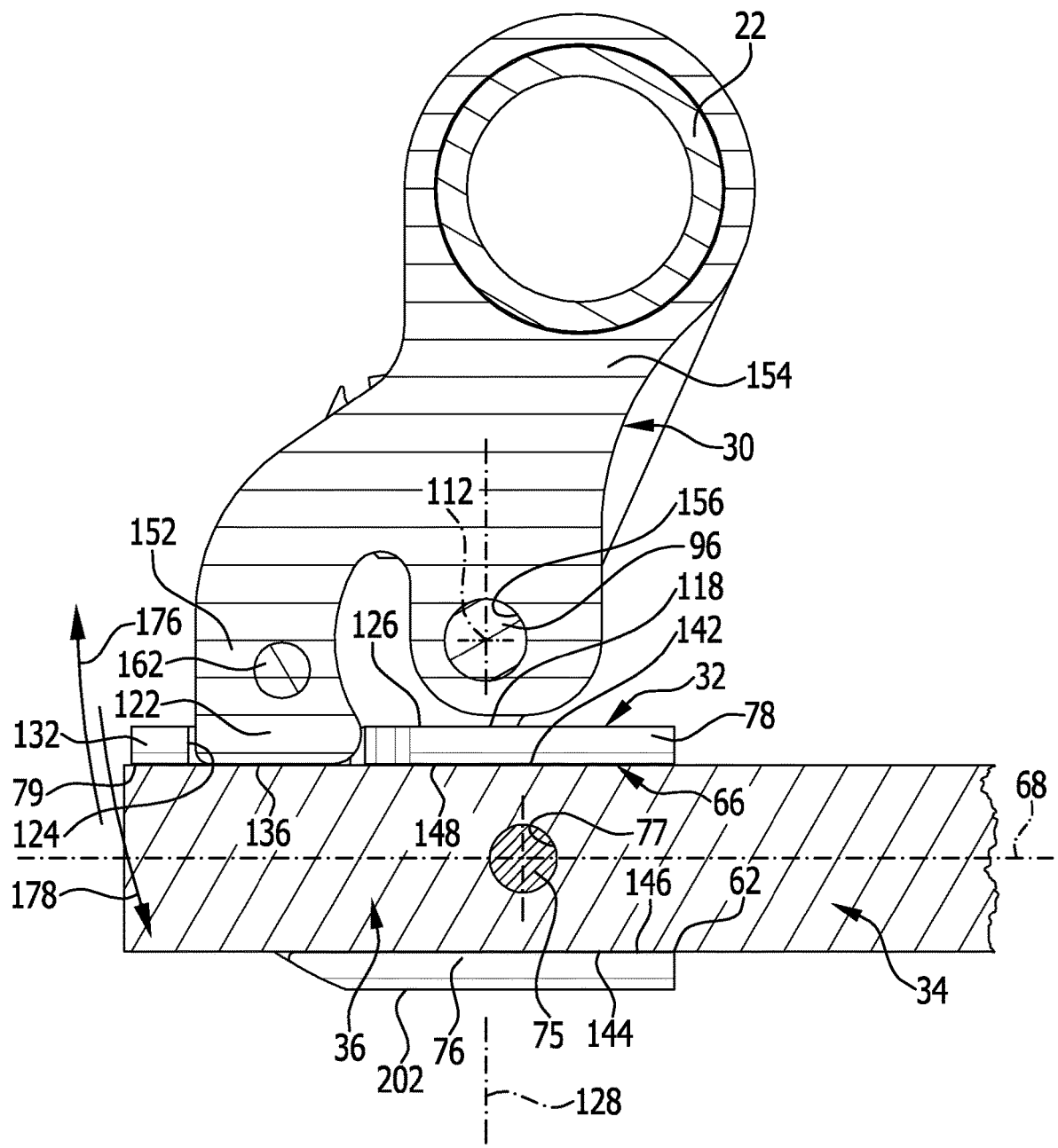
FIG. 4 shows a section along line 4-4 in FIG. 3.
Figure 5:
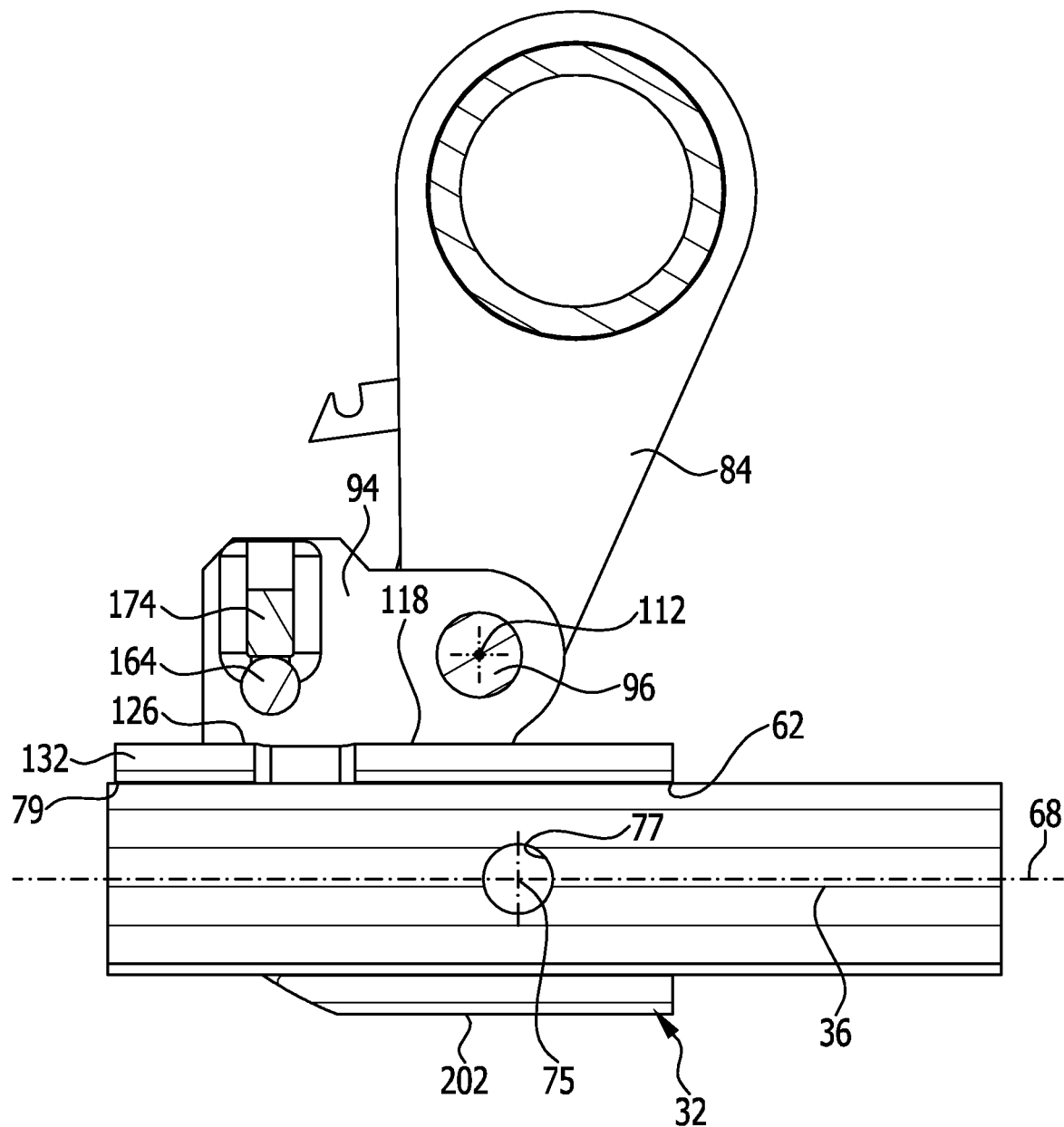
FIG. 5 shows a section along line 5-5 in FIG. 3.

The ball neck receiving body 32, at a spacing from the insertion opening 62, is provided in the region of the mutually opposed side walls 72 and 74 with through openings 73, through which a fixing pin 75 illustrated in FIG. 3 to FIG. 5 is passable in order to pass through the insertion portion 36 of the ball neck 34 inserted into the ball neck receptacle 66 in a through opening 77 and in order to fix said ball neck relative to the ball neck receiving body 32, such that the ball neck is fixed in the ball neck receptacle 66 so as to be immobile with respect to movements in a direction parallel to the central axis 68.

In addition, the insertion portion 36 is also fixed in the ball neck receptacle 66 against a rotational movement about the central axis 68 since the ball neck receptacle 66 has an approximately rectangular or square cross-sectional shape, and in addition is also fixed against movements transverse to the central axis 68 since the insertion portion 36 of the ball neck 34 is guided merely with little play in the ball neck receptacle 66 by the side walls 72 and 74 and the transverse walls 76 and 78.

The ball neck receiving body 32, as illustrated in FIGS. 3, 4 and 5, is preferably formed such that the ball neck receptacle 66, starting from the insertion opening 66, extends fully through said receiving body, more specifically for example as far as a rear-side opening 79 in the ball neck receiving body 32 opposite the insertion opening 62.

The ball neck receiving body 32, as can be seen from FIGS. 1 to 3, lies above the roadway 54 and at such a spacing from the roadway 54 that the ball neck receiving body lies close to, but below a plane 56 running through the lower edge 52 of the bumper unit 50 and extending approximately parallel to the roadway 54.

The ball neck 34 is thus easily insertable into the easily accessible insertion opening 62 of the ball neck receptacle 66, and the ball neck receiving body 32 is also accessible in such a way that the fixing pin 75 can be inserted through the through openings 73 and 77 with good accessibility.

As illustrated in FIGS. 2, 3, 4 and 6, the holding unit 30 comprises two side parts 82 and 84, which are connected to the crossmember 22 and which extend in the direction of the ball neck receiving body 32 starting from the crossmember 22 and are arranged such that there is a receiving space 86 between them.

With the ball neck receiving body 32 in the working position, bearing elements 92 and 94 connected to the ball neck receiving body 32, in particular to the side walls 72, 74, engage in this receiving space 86 and is pivotable relative to a bearing pin 96, wherein the bearing pin 96 passes through through openings 102 and 104 in the side parts 82 and 84 of the holding unit 30 and through openings 106 and 108 in the bearing elements 92 and 94.

Here, the bearing pin 96 is either in turn mounted rotatably in the through openings 102 and 104 or passes through the through openings 102 and 104 and is non-rotatably connected thereto and the bearing elements 92 and 94, with the through openings 106 and 108, are mounted rotatably relative to the bearing pin 96.

However, it is also conceivable that the bearing pin 96 for reasons of simplicity is arranged both rotatably relative to the bearing elements 92 and 94 and to the side parts 82 and 84.

The bearing elements 92 and 94 with the through openings 106 and 108, and the side parts 82 and 84 with the through openings 102 and 104, and also the bearing pin 96 as a whole form a pivot bearing unit 110 for supporting the ball neck receiving body 32 such that this can be pivoted about a pivot axis 112 defined by a central axis of the bearing pin 96.

By way of example, the pivot axis 112 is the sole pivot axis about which the ball neck receiving body 32 is pivotable relative to the holding unit 30.

In particular, the pivot axis 112 also runs parallel or substantially parallel to the crossmember 22, wherein "substantially parallel" also allows a deviation of up to 20° from an exact parallel orientation.

As illustrated in FIG. 3, the ball neck receiving body 32, at least with its middle region 118 comprising the through openings 73, as considered in the direction of the force of gravity lies below the side parts 82, 84 of the holding unit 30 and below the plane 56, the spacing of which from the roadway 54 is defined by the spacing of the lower edge 52 of the bumper unit 50 from the roadway 54.

In order to fix the ball neck receiving body 32 in the working position, a stop element 122 is provided, as illustrated in FIG. 4, which stop element passes through a through opening 124 of the ball neck receiving body 32, wherein the through opening 124 lies in a region 126 of the transverse wall 78 of the ball neck receiving body 32 facing towards the pivot axis 112, which region extends between the middle region 118 and a rear-side end 132 of the ball neck receiving body 32 facing away from the insertion opening 62, wherein in particular the region 126 of the transverse wall 78 of the ball neck receiving body 32 in the working position also lies between a vertical line 128 through the pivot axis 112 and the rear-side end 132 of the ball neck receiving body 32 facing away from the insertion opening 62 in the working position.

In particular, the through opening 124 lies on a side of the ball neck receiving body 32 facing towards the pivot bearing unit 110, preferably in the transverse wall 78 extending at least in part approximately parallel to the pivot axis 112 and in a flat side 134 of the ball neck receiving body 32 facing towards the pivot axis 112.

Since the stop element 122 passes through the through opening 124 in the working position, the stop element 122 forms a support surface 136 which, as illustrated in FIG. 4, in the working position constitutes a partial region of an inner transverse wall surface 148 of the transverse wall 78 running parallel to the central axis 68 of the ball neck receptacle 66 and at least in part parallel to the pivot axis 112 and delimiting the ball neck receptacle 66, said inner transverse wall surface supporting the insertion portion 36 on the side thereof 142 facing towards the pivot axis 112, whereas the insertion portion 36 is supported on a side 144 which is opposite the side 142, faces away from the pivot axis 112, and for example faces towards the roadway 54, on an inner transverse wall surface 146 of the transverse wall 76 delimiting the ball neck receptacle 66, wherein the transverse wall surface 148 also runs parallel to the central axis 68 and at least in part parallel to the pivot axis 112.

In order to fix the stop element 122 relative to the holding unit 30, the stop element 122 is held by a stop support 152, which extends from the stop element 122 as far as a support carrier 154, which for example is arranged between the side parts 82 and 84 and is thus arranged for example in a fixed manner relative to the holding unit 30 in that the support carrier 154 is on the one hand fixedly connected to the crossmember 22 and on the other hand has a through opening 156, through which the bearing pin 96 is passed, such that a stable connection is established between the support carrier 154 and the side parts 82 and 84 of the holding unit 30 by means of the crossmember 22 and the bearing pin 96.

The stop support 152 preferably extends by means of the stop element 122 arranged at one end of said support on a side facing away from the bumper unit 50 and therefore on a side of the holding unit 30 facing towards the rear-end region 14 and arranged in the direction of forward travel.

As illustrated in FIG. 4, the stop support 152 is also provided with stop elements 162, 164, which extend on either side of the stop support and moreover extend on either side of the stop support 152 in the direction of the bearing elements 92 and 94 and, on their sides facing away from the ball neck receiving body 32, in the working position abut against pivot stops 172 and 174 fixedly connected to the bearing elements 92 and 94, as illustrated in FIG. 5.

By means of the stop elements 162, 164 and the pivot stops 172 and 174 cooperating therewith and also the stop element 122, the ball neck receiving body 32 in the working position, illustrated in FIGS. 1 to 6, is thus rotationally fixed in relation to the pivot axis 112, since on the one hand in the working position the insertion portion 36 inserted into the ball neck receptacle 66 abuts, by means of its side 142 facing towards the pivot axis 112, against the first support surface 136 of the stop element 122 and thus prevents the unit formed of the ball neck receiving body 32 and insertion portion 36 from being able to pivot in a pivot direction 176, such that the end 132 of the ball neck receiving body 32 opposite the insertion opening 62 moves together with the insertion portion 36 in the direction of the support carrier 154.

On the other hand, because in the working position they abut against the stop elements 162 and 164 extending on either side of the stop support 152, the pivot stops 172 and 174 prevent the end 132 of the ball neck receiving body 32 from pivoting away from the support carrier 154 in a pivot direction 178 opposite the pivot direction 176.

Figure 7:
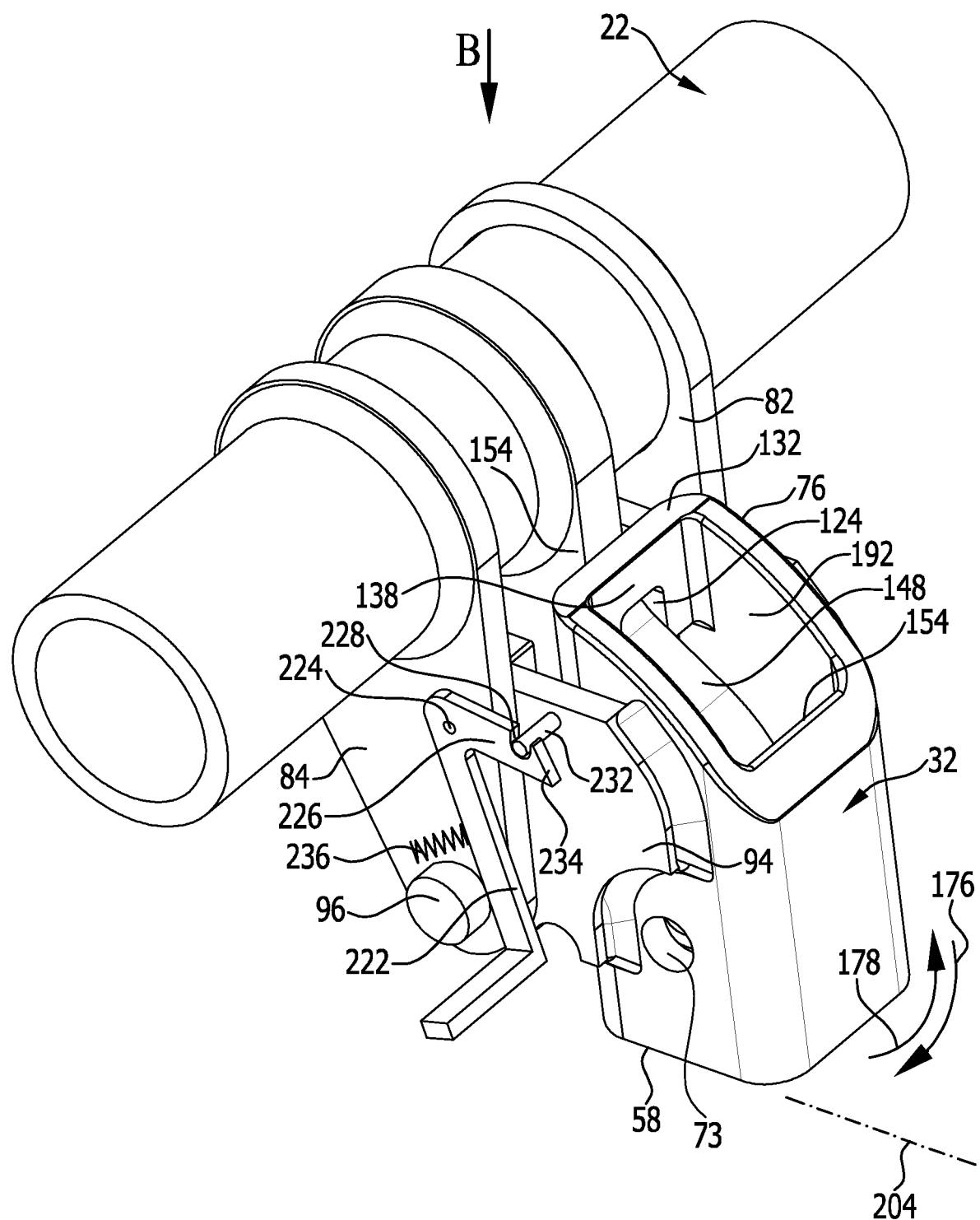
FIG. 7 shows a perspective illustration of the first exemplary embodiment of the trailer device according to the invention in the rest position from the front left.
Figure 8:
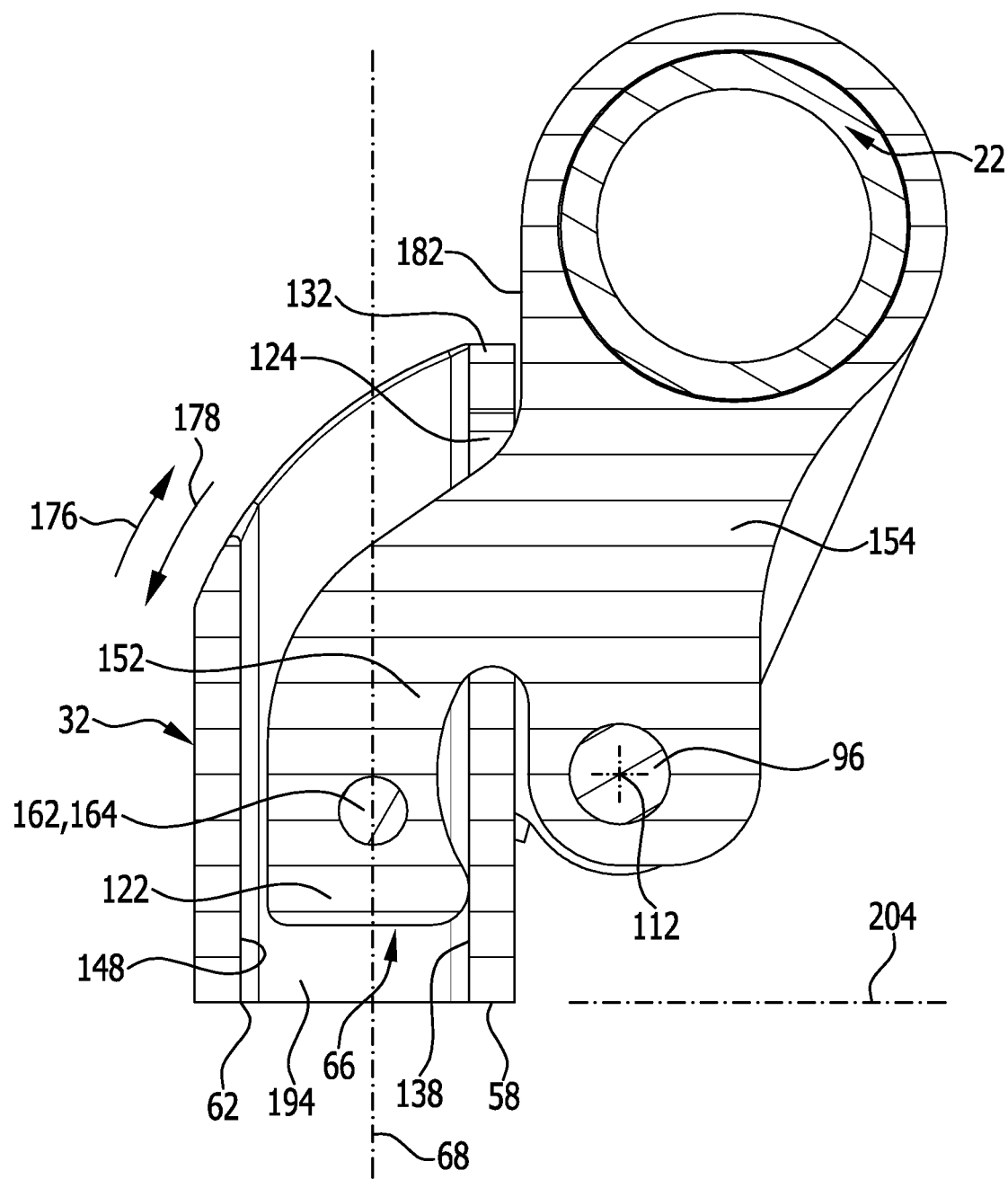
FIG. 8 shows a section similar to FIG. 4 through the trailer device according to the invention in the rest position.
Figure 9:
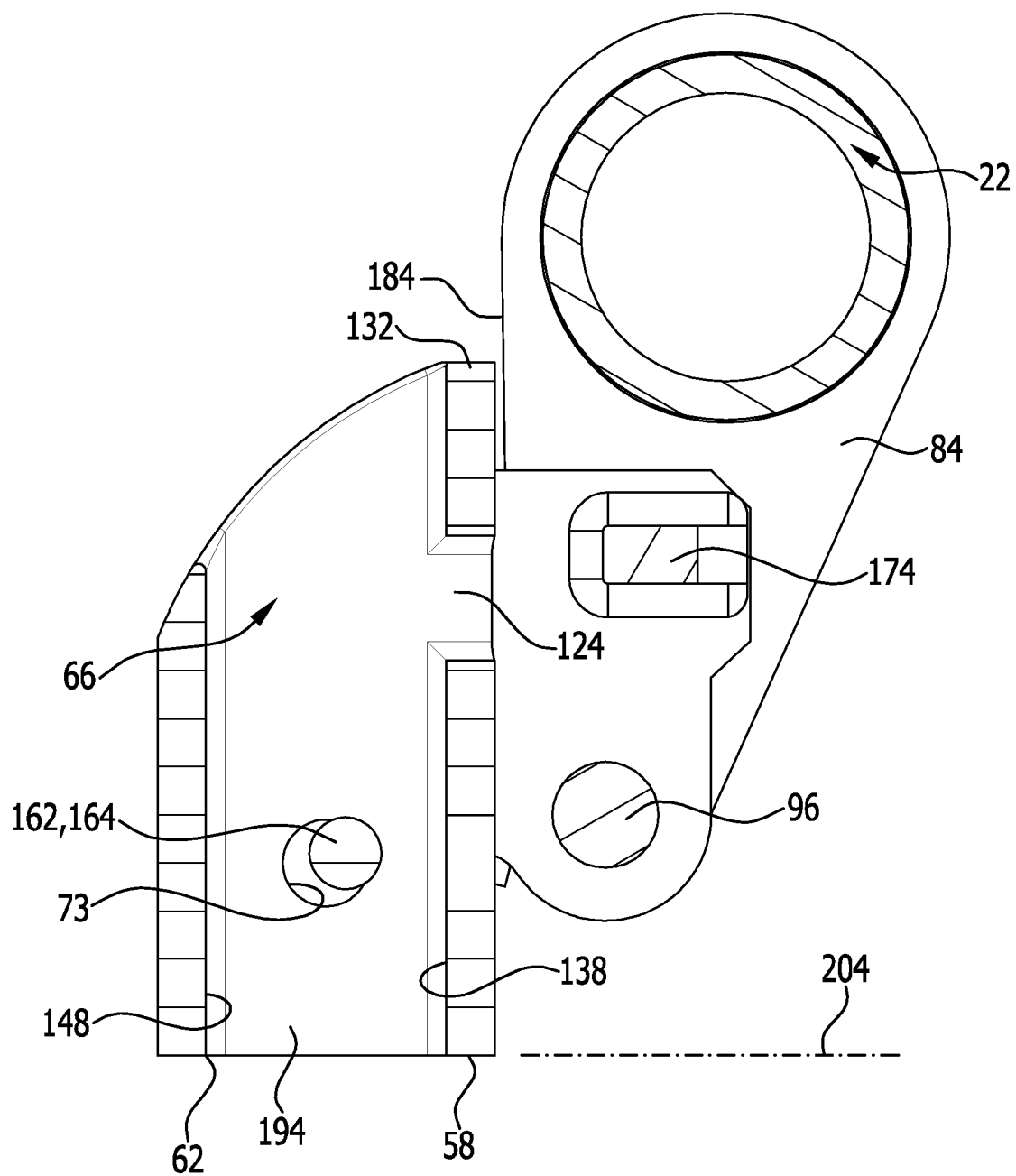
FIG. 9 shows a section similar to FIG. 5 through the trailer device according to the invention in the rest position.
Figure 10:
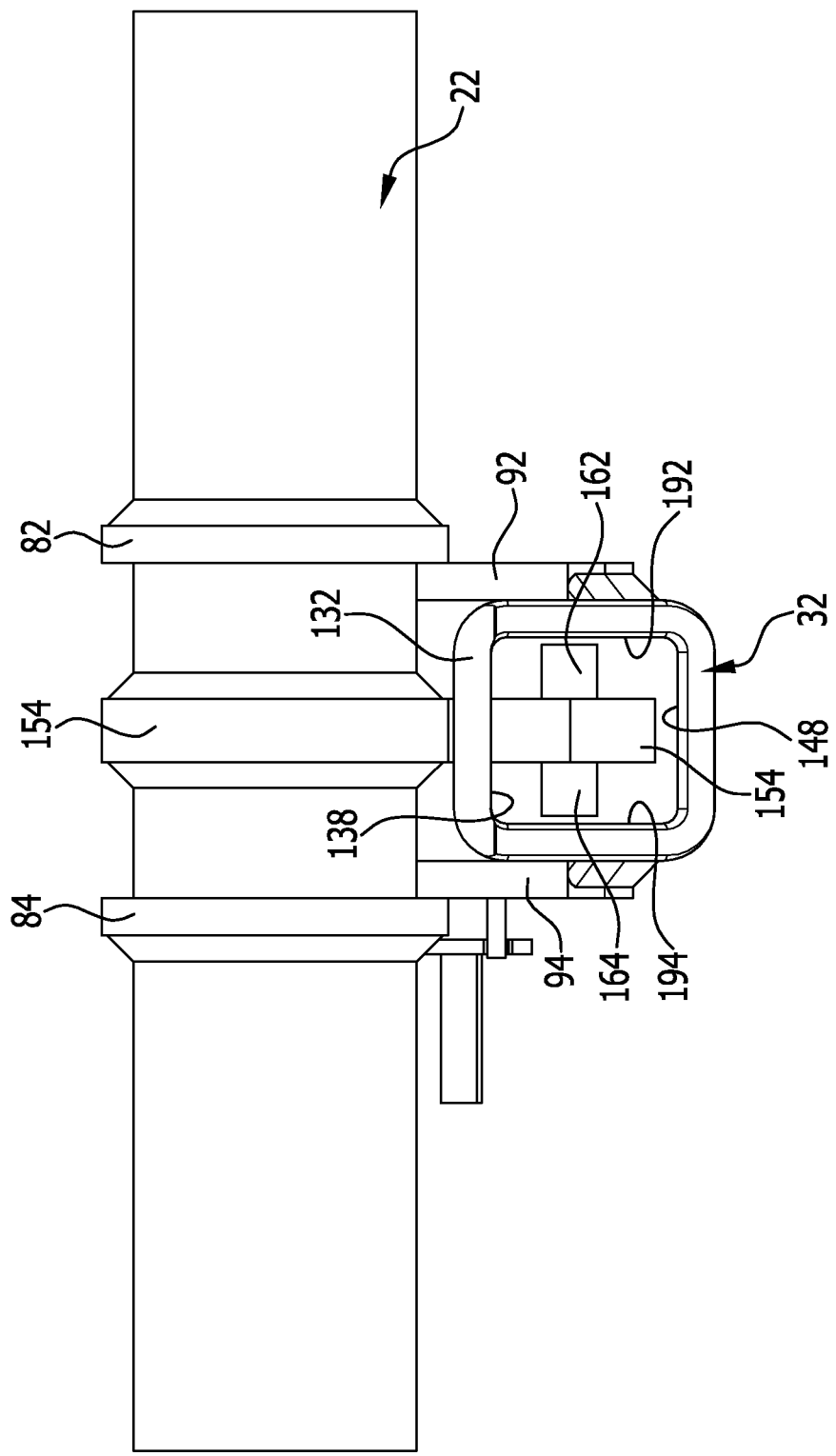
FIG. 10 shows a plan view from above in the vertical direction in accordance with the arrow B in FIG. 7.

If, however, the insertion portion 36 of the ball neck 34 is removed from the ball neck receptacle 66, the above-described blocking of the pivot motion of the ball neck receiving body 32 in the pivot direction 176 is no longer required, and it is possible, as illustrated in FIGS. 7 to 10, to pivot the ball neck receiving body 32 from the working position into a rest position, in which the end 132 of the ball neck receiving body 32 opposite the insertion opening 62 moves in the direction of the support carrier 154 until it abuts against a front side 182 of the support carrier 154 (as considered in the direction of forward travel), as illustrated in FIG. 8, and also, as illustrated in FIG. 9, abuts against front sides 184 of the side parts 82 and 84, as in the case of the side part 84 illustrated in FIG. 9.

During this pivot motion of the ball neck receiving body 32 in the pivot direction 176, the stop element 122 enters together with the stop support 152 through the through opening 124 and into the ball neck receptacle 66 of the ball neck receiving body 32, such that, as illustrated in FIG. 8, in the rest position the stop element 122 lies with the stop support 152 inside the ball neck receptacle 66, without blocking the pivoting of the ball neck receiving body 32 into the rest position in the pivot direction 176.

For this purpose, the stop support 152 is preferably formed such that it extends arcuately away from the support carrier 154 as far as the stop element 122, and the stop element 122 transversely to the central axis 68 of the ball neck receptacle 66 has an extent that is preferably shorter than the extent of the ball neck receptacle 66 transversely to the central axis 68 thereof and transversely to the pivot axis 112, as illustrated in FIG. 8.

Figure 6:
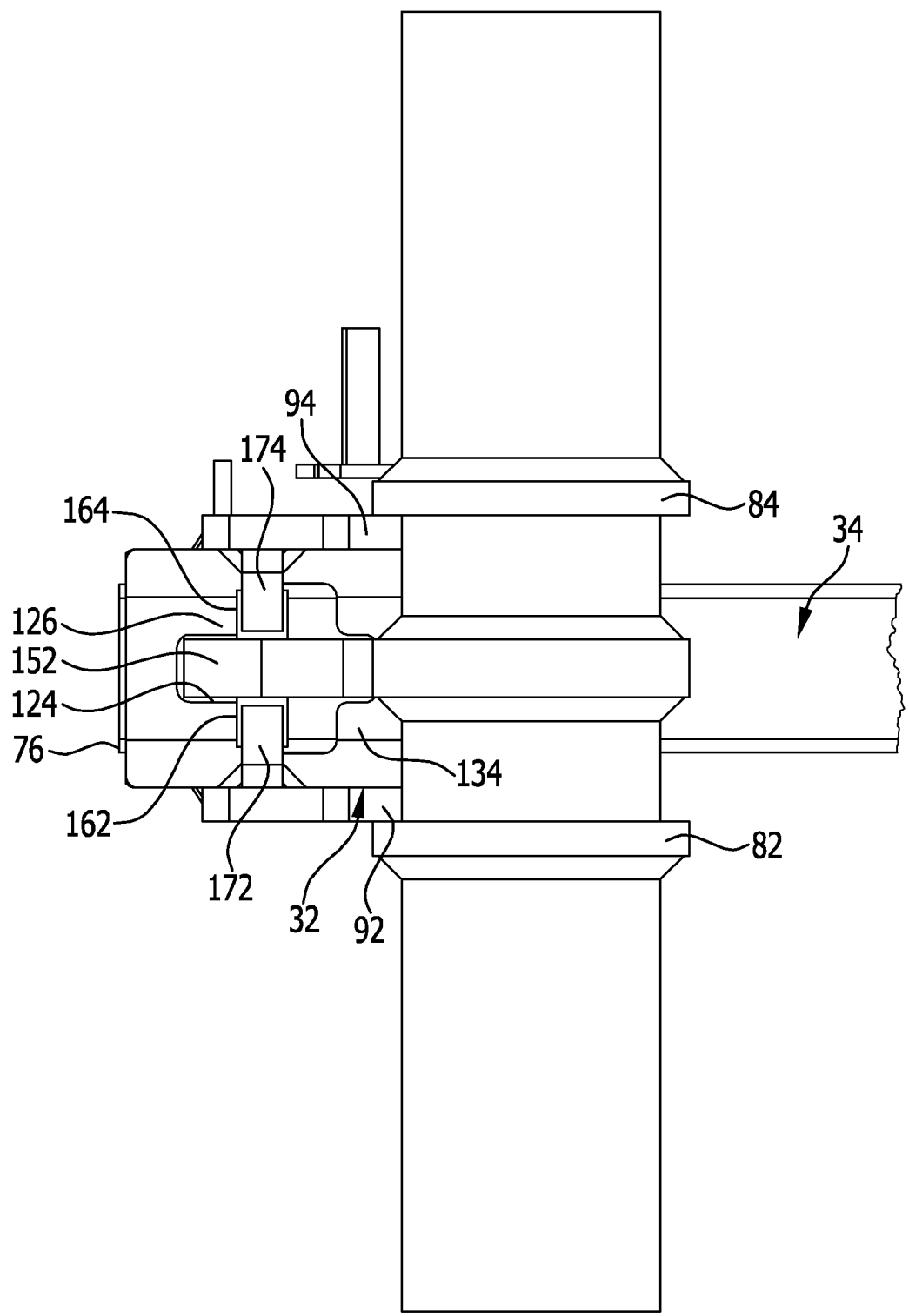
FIG. 6 shows a plan view from above in the vertical direction in the direction of the arrow A in FIG. 2.

As the stop support 152 enters into the ball neck receptacle 66, the stop elements 162 and 164 also enter into the ball neck receptacle 66 of the ball neck receiving body 32, which makes it possible, as illustrated in FIG. 6, for the through opening 124 to extend in the direction of the bearing elements 92 and 94 and in particular thus also parallel to the pivot axis 112 preferably as far as mutually opposed side wall surfaces 192 and 194 of the ball neck receptacle 66 laterally delimiting the ball neck receptacle 66, wherein the side wall surfaces 192 and 194 run on the one hand parallel to the central axis 68 and on the other hand at least in part transversely to the pivot axis 112.

For this reason, the extent of the stop elements 162 and 164 in the direction of the bearing elements 92 and 94 is dimensioned such that the stop elements 162 and 164, as the ball neck receiving body 32 is pivoted from the working position into the rest position, can also enter the ball neck receptacle 66 in a collision-free manner with the support carrier 154, and in doing so lie between the side wall surfaces 192 and 194 of the ball neck receptacle 66.

It is thus possible to pivot the ball neck receiving body 32 between the working position illustrated in FIGS. 1 to 6 and the rest position illustrated in FIGS. 7 to 10 without the insertion portion 36 of the ball neck 34 inserted into the ball neck receptacle 66, wherein, as the ball neck receiving body 32 is pivoted from the rest position into the working position in the pivot direction 178, the pivot motion is delimited by the pivot stops 172 and 174 cooperating with the stop elements 162 and 164 on the stop support 152, said pivot stops being arranged on the bearing elements 92 and 94 and blocking the pivot direction 176 as the insertion portion 36 is inserted into the ball neck receptacle 66 in that the insertion portion 36 abuts against the support surface 136 of the stop element 122 and thus blocks the pivot motion of the unit formed of the ball neck receiving body 32 and insertion portion 36.

The above-explained ways in which the pivot directions 176 and 178 are blocked in the working position thus allow a stable non-rotational fixing of the ball neck receiving body 32 together with the inserted ball neck 34 in the working position in a manner capable of withstanding the operational loads with trailer operation.

As can be seen from a comparison of FIGS. 1 to 6 and 7 to 10, the ball neck receiving body 32, as a result of the pivoting about the pivot axis 112, is raised with the end 132 opposite the insertion opening 62 and is pivoted in the direction of the crossmember 22, wherein at the same time the end face 58 with the insertion opening 62 is initially moved downwardly away from the lower edge 52 of the bumper unit 50 and thus also away from the plane 56, but is then raised by continued pivoting, such that the insertion opening 62 ultimately, in the rest position illustrated in FIGS. 7 to 10, is raised to such an extent that the end face 58 of the ball neck receiving body 32 comprising the insertion opening 62 faces towards the roadway 54 and additionally is arranged at a greater spacing from the roadway 54 than a lowest region 202, facing towards the roadway, of the ball neck receiving body 32 arranged in the working position, wherein this lowest region 202 is preferably formed by a side of the ball neck receiving body 32 facing towards the roadway 54 in the working position.

In the rest position, the end face 58 preferably lies in a plane 204 which runs parallel to the roadway 54 and which has a greater spacing from the roadway 54 than the central axis 68 of the ball neck receptacle 66 in the working position of the ball neck receiving body 32.

By way of example, the ball neck receiving body 32 in the rest position, as illustrated in FIGS. 8 and 9, lies in front of the pivot axis 112 as considered in the direction of forward travel of the motor vehicle 10 and thus lies on a side of the pivot axis 112 facing towards the rear-end region 14 of the body 12.

In particular, it is provided here that the central axis 68 of the ball neck receptacle 66 in the rest position has a substantially parallel course to the vertical line 128, wherein a substantially parallel course of the central axis 68 in the rest position is understood to mean a deviation of up to 30 degrees from a course exactly parallel to the vertical line 128.

The specification of this course of the central axis 68 substantially parallel to the vertical relates here to the case in which the motor vehicle comprising the trailer device according to the invention is standing on a horizontal roadway 54.

These positions of the ball neck receiving body 32 both in the working position and in the rest position in particular can be implemented in that the pivot axis 112 in the working position of the ball neck receiving body 32 lies on a side of the ball neck receiving body 32 facing away from the roadway 54 and additionally, as considered in the vertical line 128, above a partial region of the ball neck receiving body 32 extending starting from the end face 58 and comprising the through openings 73 for the fixing pin 75 and extending parallel to the central axis 68 as far as at most a longitudinal centre of the ball neck receiving body 32.

In order to fix the ball neck receiving body 32 in the rest position, illustrated in FIGS. 7 to 10, a locking device 220 is provided, which for example, as illustrated in FIG. 7, comprises a swivel latch 222, which is mounted on the side part 84 so as to be pivotable about a pivot axis 224, wherein the swivel latch 222 comprises a latch finger 226 having a latch receptacle 228, which in the rest position receives a latch element 232 fixedly arranged on the bearing element 94 and thus fixes the bearing element 94 non-rotationally in the rest position, together with the ball neck receiving body 32 fixedly connected to said bearing element.

Here, the latch finger 226 having the latch receptacle 228 is provided with a ramp 234, such that, as the ball neck receiving body 32 is pivoted from the working position into the rest position illustrated in FIG. 7, the latch element 232 can act against the ramp 234 and can pivot the latch finger 226 to such an extent that the latch element 232 can enter the latch receptacle 228 and can be fixed by this.

Here, the swivel latch 222 is acted on for example by a spring element 236 in its position fixing the latch element 232 in the latch receptacle 228.

In the event that the swivel latch 222 is acted on manually, it can be pivoted against the action of the spring element 236, such that the latch element 232 can leave the latch receptacle 228 and therefore the unit formed of the bearing elements 92 and 94 and the ball neck receiving body 32 is pivotable in the direction of the working position in the pivot direction 178.

Figure 11:
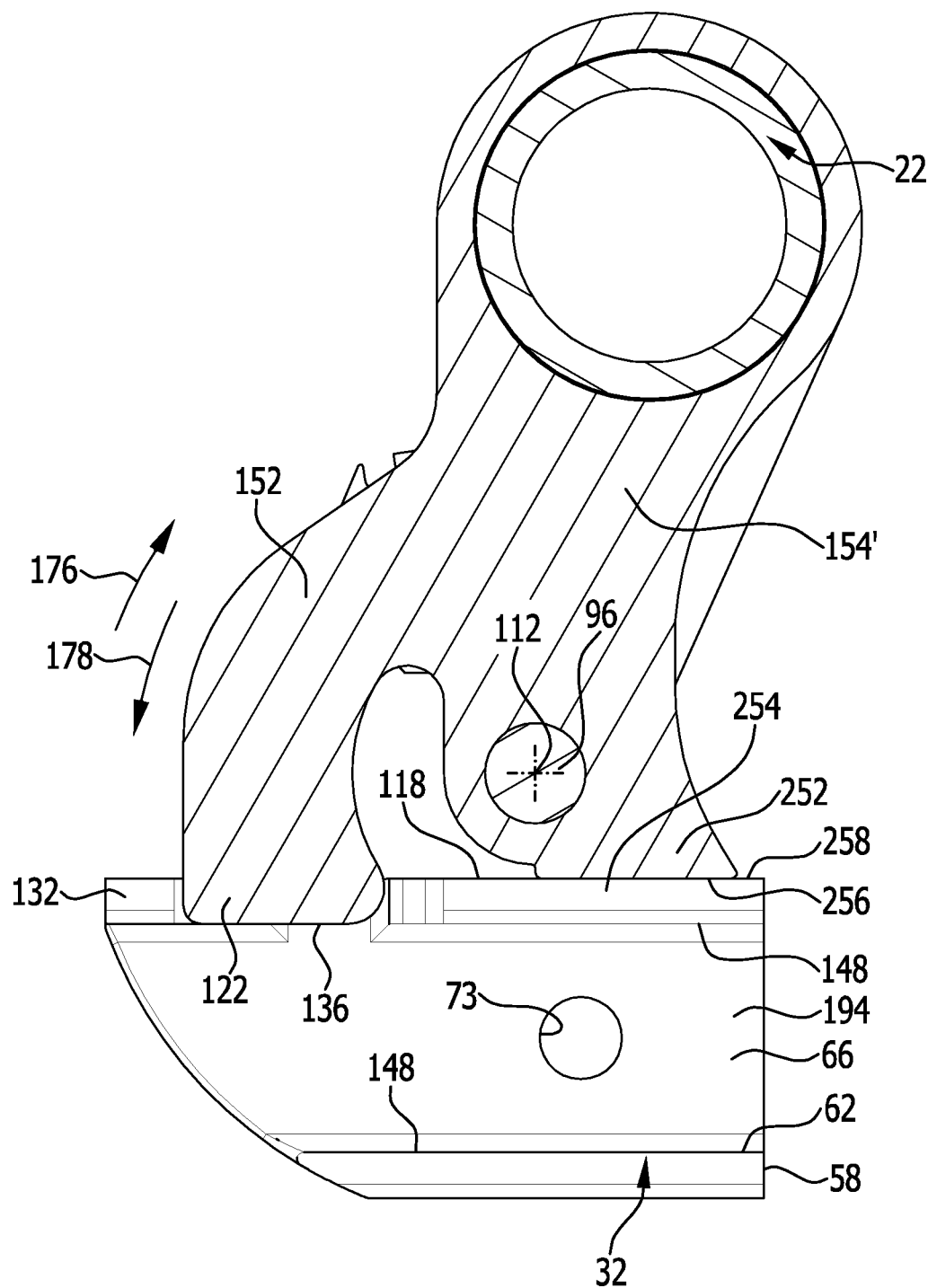
FIG. 11 shows a section similar to FIG. 4 through a second exemplary embodiment of a trailer device according to the invention in the working position.
Figure 12:
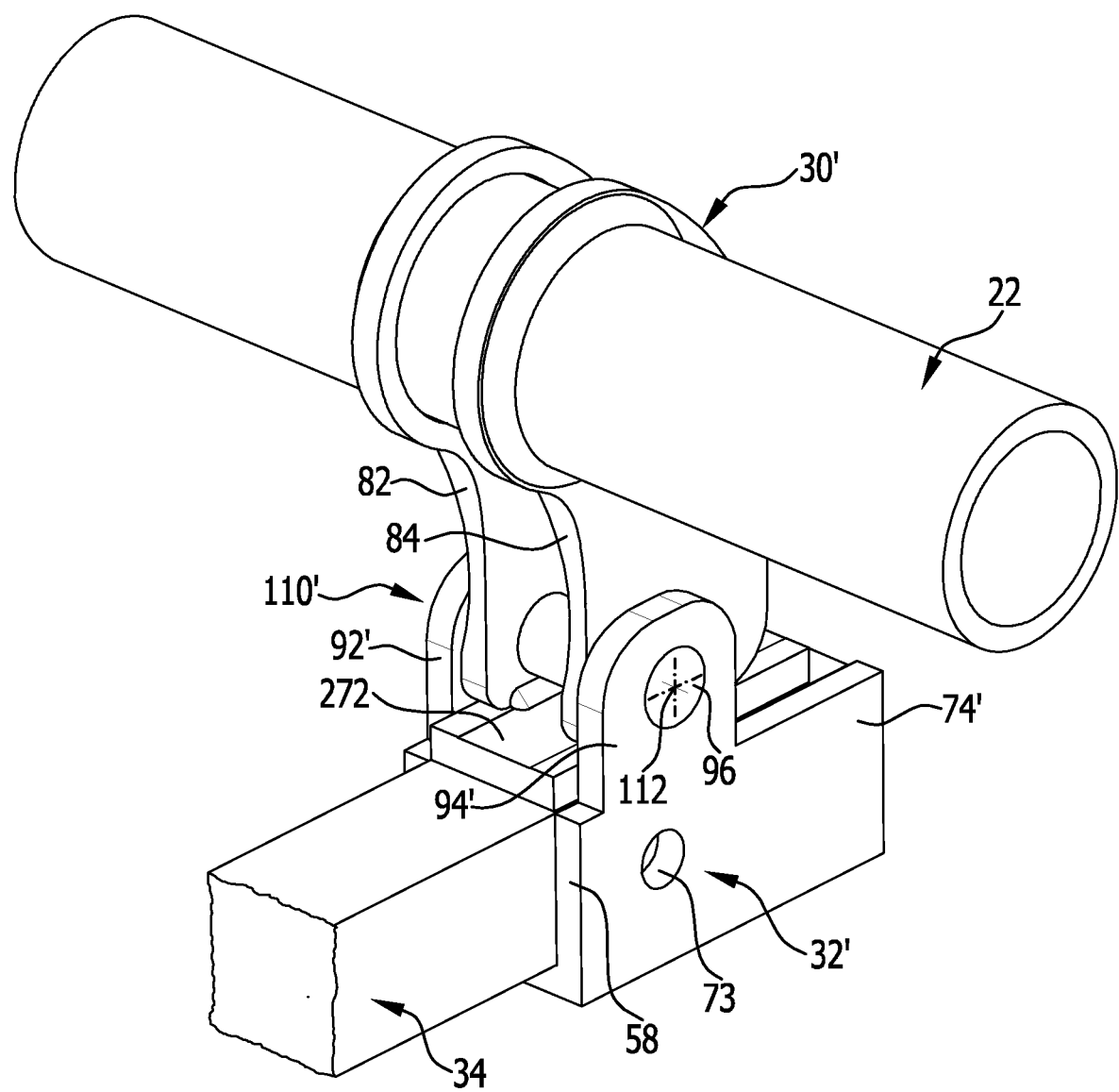
FIG. 12 shows a perspective illustration of a third exemplary embodiment of a trailer device according to the invention similar to FIG. 2 in the working position.
Figure 13:
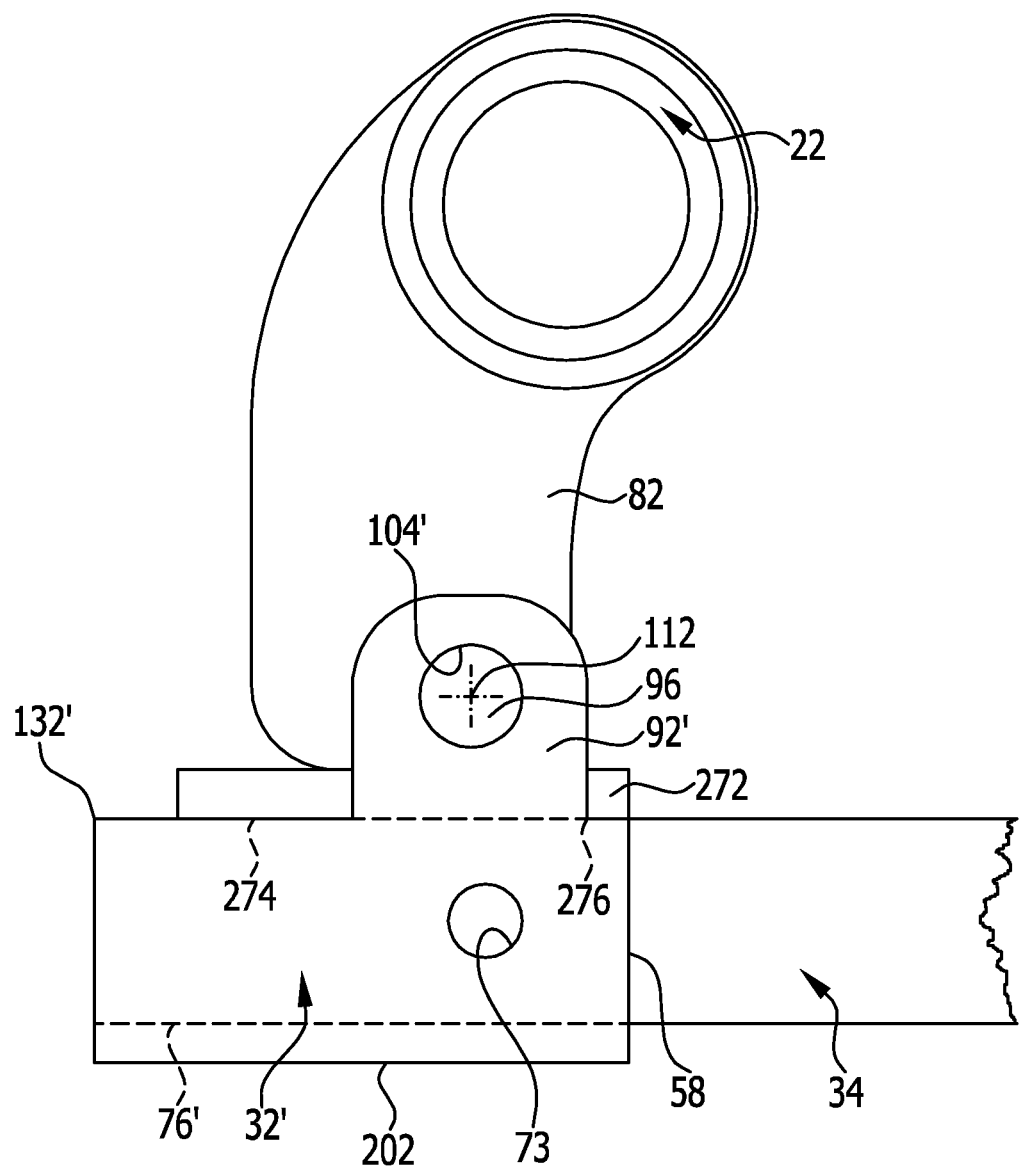
FIG. 13 shows a side view of the third exemplary embodiment of the trailer device according to the invention in the working position in the direction of the arrow C in FIG. 14.
Figure 14:
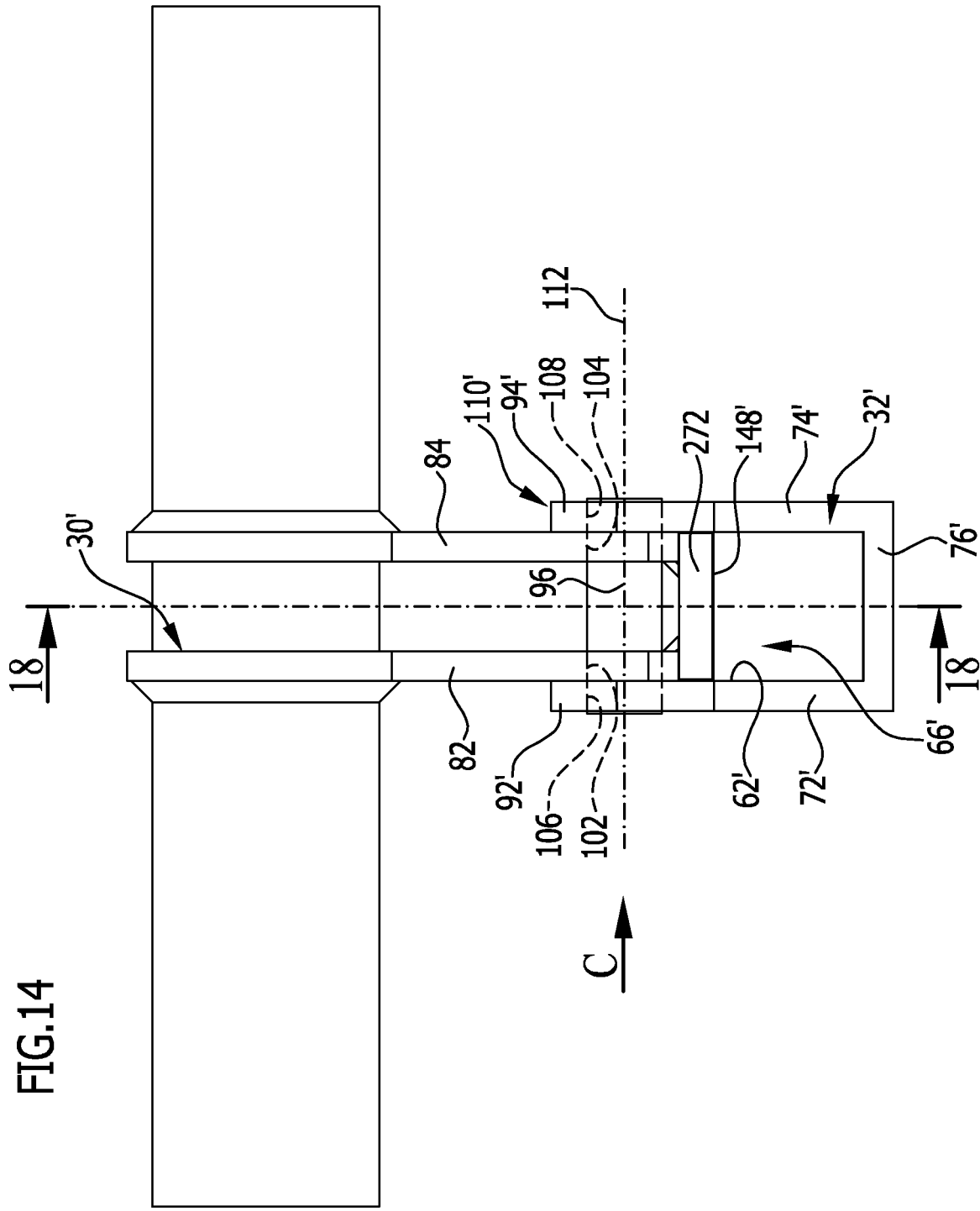
FIG. 14 shows a view of the third exemplary embodiment of the trailer device according to the invention in the working position from the rear side of the vehicle.
Figure 15:
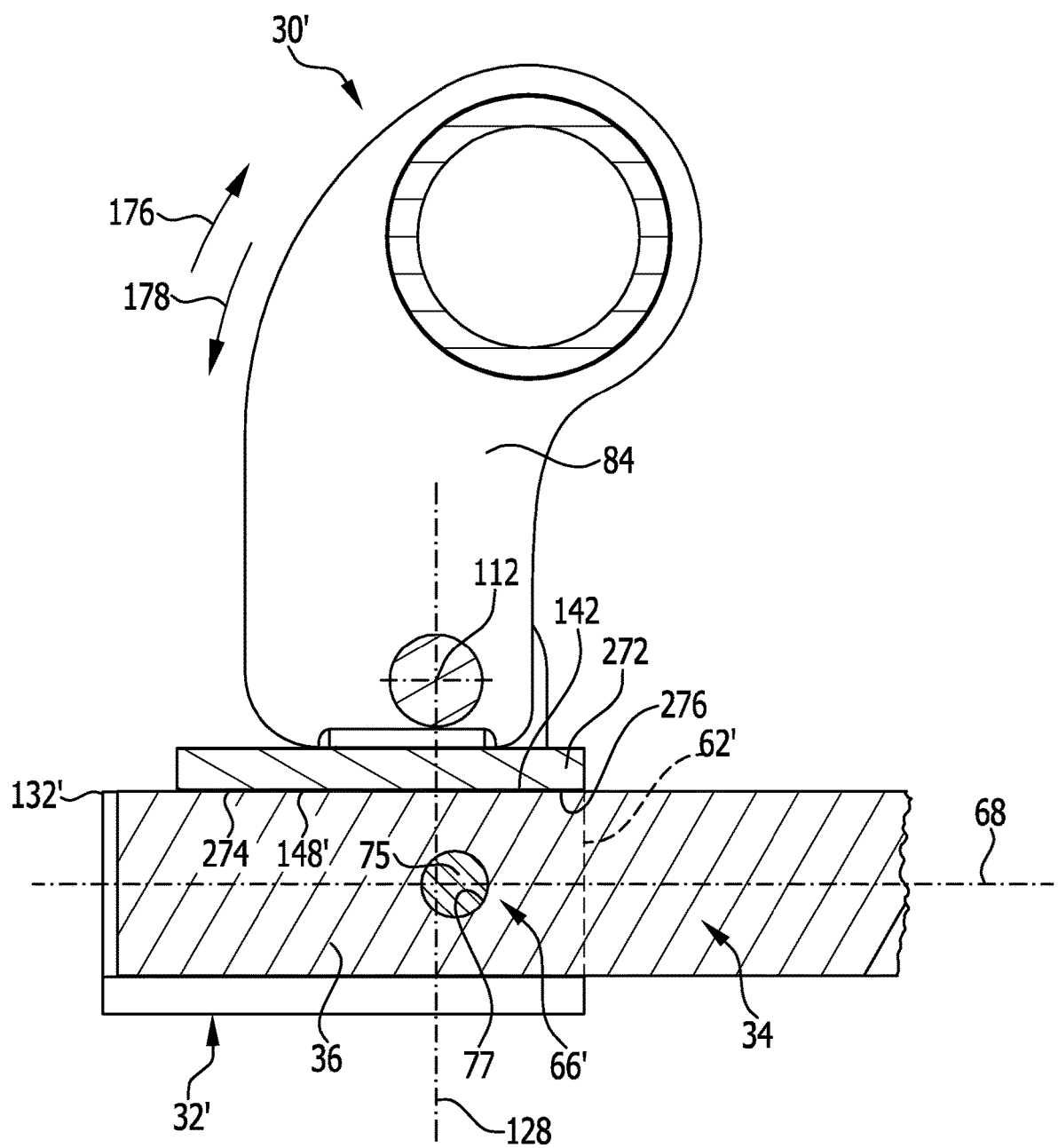
FIG. 15 shows a section similar to FIG. 4 through the third exemplary embodiment of the trailer device according to the invention in the working position.
Figure 16:
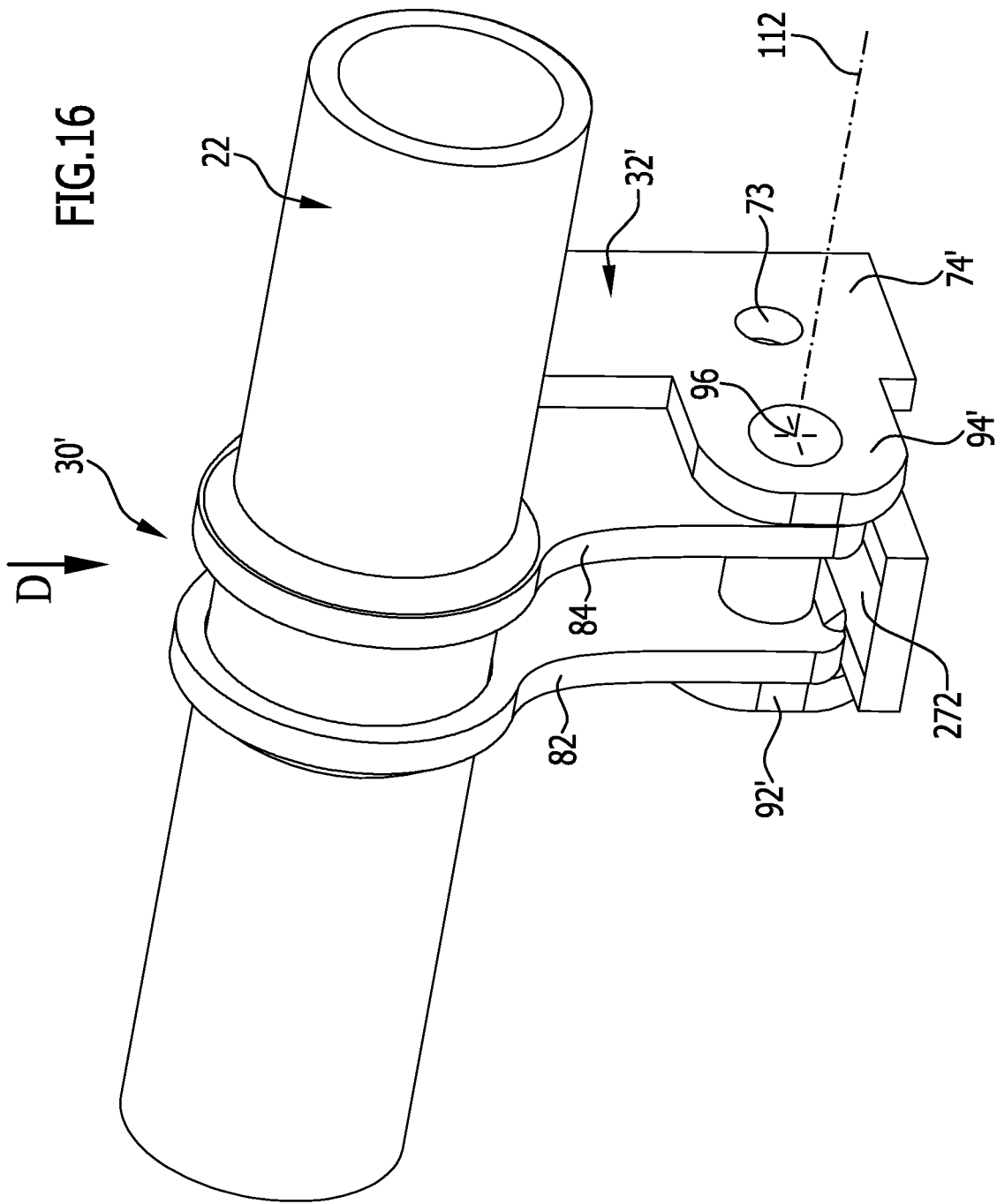
FIG. 16 shows a perspective illustration of the third exemplary embodiment of the trailer device according to the invention from the rear right in the rest position.
Figure 17:
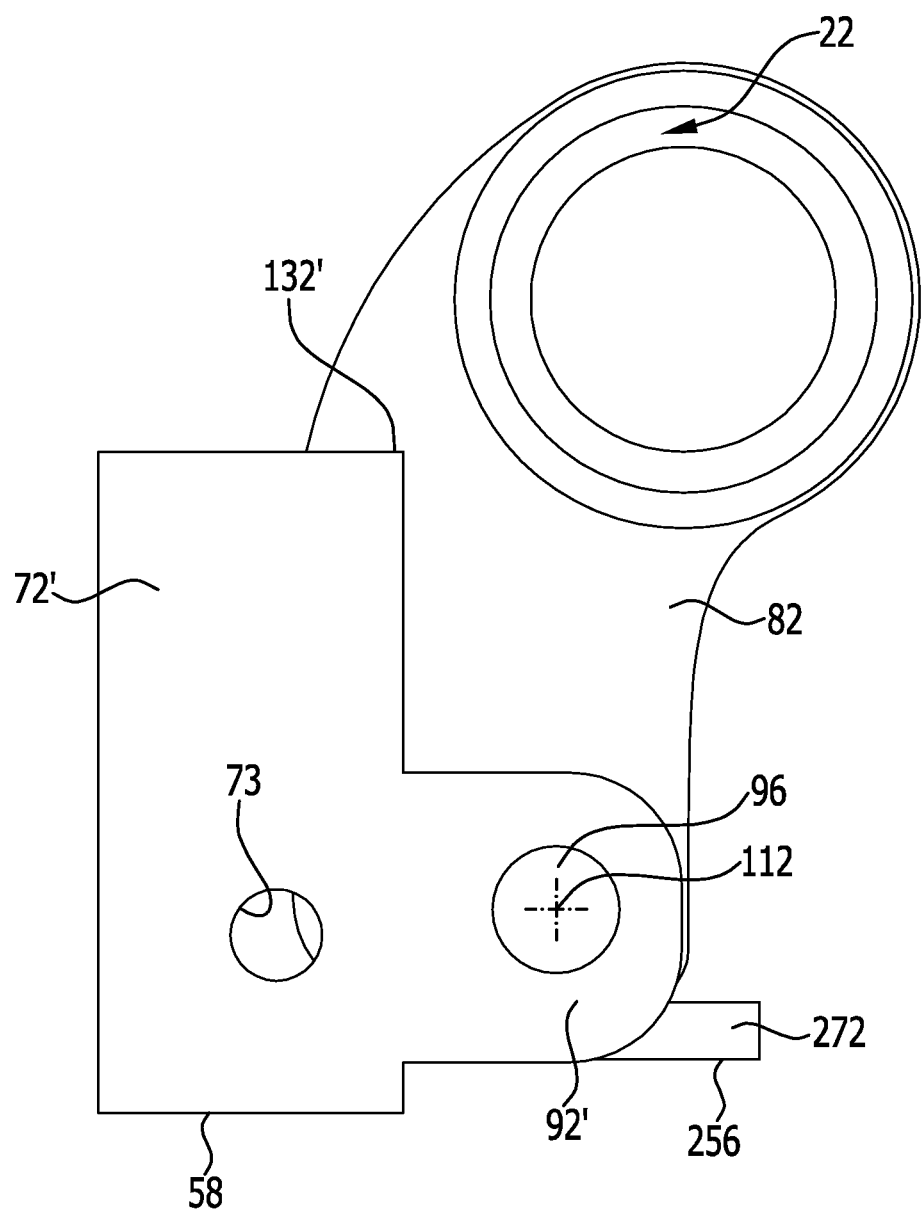
FIG. 17 shows a side view of the third exemplary embodiment of the trailer device according to the invention in the rest position similar to FIG. 13.
Figure 18:
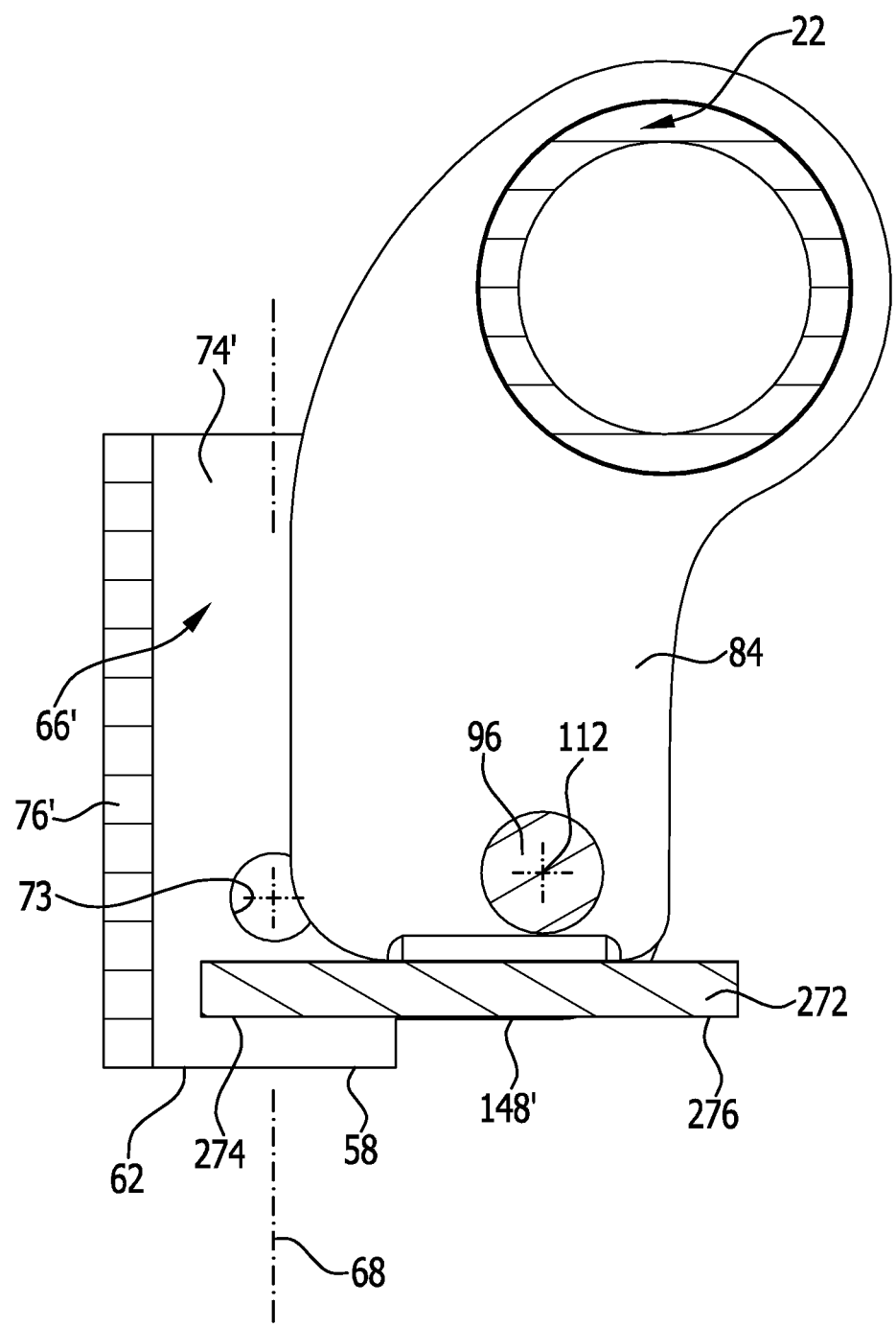
FIG. 18 shows a section through the third exemplary embodiment of the trailer coupling according to the invention along the line 18-18 in FIG. 14.

In a second exemplary embodiment, illustrated in FIG. 11, the holding unit 30, the ball neck receiving body 32, and the pivot bearing unit 110 supporting these pivotably about the pivot axis, are formed in the same manner as in the first exemplary embodiment.

The stop element 122 and the stop support 152 are formed in the same manner as in the first exemplary embodiment.

In a modification of the first exemplary embodiment, however, the support carrier 154 is provided with a second stop element 252, which in the working position limits the pivot motion of the ball receiving body 32 in the pivot direction 178, more specifically in that the second stop element 252 in the working position, by means of a region 254 which lies between the middle region 118 and the end face 58 and which in particular is a rearward region 254 of the ball neck receiving body 32 as considered in the direction of forward travel and in particular extends as far as the end face 58 of the pivot bearing body 132, forms a pivot stop and in so doing abuts by means of its outer surface 258 against a support surface 256 of the stop element 252 and thus blocks the pivot motion in the pivot direction 178 when the working position has been reached.

The stop elements 162 and 164 on the stop support 152 and the pivot stops 172 and 174 on the bearing elements 92 and 94 are thus no longer required.

With regard to all other features, the second exemplary embodiment according to FIG. 11 is constructed in the same manner as the first exemplary embodiment and is also identical, in terms of the other functions, to the functions of the first exemplary embodiment, such that reference can be made in this respect to the comments provided in relation to the first exemplary embodiment.

In a third exemplary embodiment, illustrated in FIGS. 12 to 19, the pivot bearing unit 110' is also formed by the side parts 82 and 84 of the holding unit 30', which can be formed in the same manner as in the first exemplary embodiment.

However, in the third exemplary embodiment, the bearing elements 92' and 94' are integrally formed on the ball neck receiving body 32 and are arranged such that the side parts 82 and 84 of the holding unit 30' lie between the bearing elements 92' and 94'.

In the third exemplary embodiment as well, the side parts 82 and 84 with their through openings 102 and 104, and also the bearing elements 92' and 94' with their through openings 106 and 108, together with the bearing pin 96 form the pivot bearing unit 110' for supporting the ball neck receiving body 32 in such a way that this is pivotable about the pivot axis 112 relative to the holding unit 30'.

In the case of the third exemplary embodiment the ball neck receiving body 32' is approximately U-shaped and comprises the side walls 72' and 74' and also the transverse wall 76' lying on a side of the side walls 72' and 74' facing away from the pivot axis 112 and connecting these side walls, whereas the ball neck receiving body 32' on its side of the ball neck receptacle 66 facing towards the pivot axis 112 itself does not have any transverse wall, but instead is open.

In the case of the third exemplary embodiment the bearing elements 92' and 94' are preferably integrally formed on the side walls 72' and 74' respectively of the ball neck receiving body 32'.

In order to delimit the ball neck receptacle 66' on the side thereof facing towards the pivot axis 112, a stop wall 272 is provided on the side parts 82 and 84 of the holding unit 30', as illustrated in FIGS. 12 to 15, and lies between the insertion opening 62 and the end 132' and by way of example extends, starting from the insertion opening 62' of the ball neck receiving body 32', parallel to the central axis 68 of the ball neck receptacle 66' in the direction of an end 132' of the ball neck receiving body 32' and has support surfaces 274 and 276 lying on either side of the vertical line 128 through the pivot axis 112 and delimiting the ball neck receptacle 66' on the side thereof facing towards the holding unit 30' or on the side thereof facing towards the pivot bearing unit 110.

Here, the first support surface 274 in particular lies in front of the vertical line 128 as considered in the direction of forward travel of the motor vehicle, and the second support surface 276 lies behind the vertical line 128 as considered in the direction of forward travel, such that the insertion portion 36 of the ball neck 34 received in the ball neck receptacle 66' is supported on the side 142 against a pivot motion, more specifically the unit formed of the ball neck receiving body 32' and the insertion portion 36 is supported against pivot motions in the direction of the pivot directions 176 and 178, wherein in particular the support surface 274 provides support against a pivot motion in the pivot direction 176, and the support surface 276 provides support against a pivot motion in the pivot direction 178.

The stop wall 272 is preferably formed such that it extends substantially over the entire width between the side wall surfaces 72' and 74' of the ball neck receiving body 32' and thus supports the insertion portion 36 on its side 142 over the entire width in the direction of the pivot axis 112.

The stop wall 272 here preferably forms the transverse wall surface 148' of the ball neck receptacle 66' supporting the side 142 of the insertion portion 36 substantially in a planar manner.

If, however, the insertion portion 36 is removed from the ball neck receptacle 66', the stop wall 272 thus no longer blocks the pivot motion of the ball neck receiving body 32' in the pivot direction 176, and the ball neck receiving body 32' thus is pivotable in the pivot direction 176 from the working position, illustrated in FIGS. 12 to 15, into the rest position, illustrated in FIGS. 16 to 19, wherein the support surfaces 274 and 276 remain still and the stop wall 272 in the rest position engages in the ball neck receptacle 66' and in particular runs transversely to the central axis 68 thereof.

The rest position is fixed by a locking device 220, which is not illustrated in the drawings, but is formed in a manner comparable to that in the first exemplary embodiment.

For the rest, the elements of the third exemplary embodiment that are identical to those in the previous exemplary embodiments are provided with the same reference signs, and therefore reference can be made to the descriptions of these elements in conjunction with those exemplary embodiments.

The invention claimed is:

1. A trailer device for motor vehicles, comprising a crossmember, which is mountable on a vehicle body at the rear-end thereof, a holding unit, which is provided on the crossmember and which carries a ball neck receiving body comprising a ball neck receptacle, into which the ball neck receiving body, an insertion portion of a ball neck supporting a coupling ball is insertable and fixable therein, the holding unit comprises a pivot bearing unit, by means of which the ball neck receiving body is movable from a working position, in which the ball neck is insertable into said receiving body for trailer operation, into a rest position, and in that at least one stop element fixedly connected to the holding unit is provided, the at least one stop element has a first support surface, which, in the working position, abuts against the insertion portion with the insertion portion inserted into the ball neck receptacle and thus blocks a pivoting of the ball neck receiving body in at least one pivot direction.

2. The trailer device according to claim 1, wherein the first support surface of the stop element with the insertion portion inserted into the ball neck receiving body in the working position blocks a pivot motion from the working position in the direction of the rest position.

3. The trailer device according to claim 1, wherein the first support surface is arranged at a spacing from the pivot bearing unit, in particular a pivot axis thereof.

4. The trailer device according to claim 1, wherein the first support surface, in the working position, extends in a direction parallel to a central axis of the ball neck receptacle.

5. The trailer device according to claim 1, wherein the first support surface extends in a direction transverse to the pivot direction to be blocked.

6. The trailer device according to claim 1, wherein the first support surface, in the working position, forms a partial region of a wall surface delimiting the ball neck receptacle.

7. The trailer device according to claim 1, wherein the first support surface, in the working position, delimits at least one portion of the ball neck receptacle.

8. The trailer device according to claim 1, wherein the first support surface is arranged on a side of the ball neck receptacle facing towards the pivot bearing unit.

9. The trailer device according to claim 1, wherein the first support surface, in the working position, abuts against a side of the insertion portion facing towards the pivot bearing unit.

10. The trailer device according to claim 1, wherein at least one further stop element is fixedly connected to the holding unit and blocks a pivot motion from the rest position in the direction of the working position, in the working position.

11. The trailer device according to claim 10, wherein at least one pivot stop fixedly connected to the ball neck receiving body abuts against the at least one further stop element in the working position.

12. The trailer device according to claim 11, wherein the at least one pivot stop is arranged on at least one bearing element of the ball neck receiving body.

13. The trailer device according to claim 11, wherein the at least one pivot stop is arranged on the ball neck receiving body.

14. The trailer device according to claim 1, wherein a second support surface in the working position when the insertion portion is inserted into the ball neck receptacle abuts against the insertion portion and thus blocks a pivot motion of the ball neck receiving body in a pivot direction from the rest position in the direction of the working position, in the working position.

15. The trailer device according to claim 1, wherein the at least one stop element is fixedly connected to the holding unit and comprises a second support surface, which in the working position forms a partial region of a wall surface of the ball neck receptacle encompassing the ball neck receptacle.

16. The trailer device according to claim 1, wherein the at least one stop element engages in the ball neck receptacle in the rest position.

17. The trailer device according to claim 1, wherein the first support surface extends in the rest position transversely to a central axis in the ball neck receptacle.

18. The trailer device according to claim 1, wherein the ball neck receiving body is formed as a receiving sleeve which has a through opening, into which the stop element extends to such an extent that in the working position the support surface contacts the insertion portion.

19. The trailer device according to claim 1, wherein the ball neck receiving body is U-shaped at least in part and has an open side, in which the first support surface and a second support surface surface lie in the working position of the ball neck receiving body.

20. The trailer device according to claim 19, wherein the open side of the ball neck receiving body in the working position faces towards the pivot bearing unit.

21. The trailer device according to claim 19, wherein in the working position the first and second support surface lie/lies between side wall surfaces of the at least partially U-shaped ball neck receiving body.

22. The trailer device according to claim 19, wherein in the working position the first or second support surface lies between side wall surfaces of the at least partially U-shaped ball neck receiving body.

23. The trailer device according to claim 1, wherein in the working position the insertion portion of the ball neck inserted into the ball neck receptacle is supported on the first support surface and a second support surface by means of a side facing towards the pivot bearing unit, in particular the pivot axis.

24. The trailer device according to claim 1, wherein in the working position a central axis of the ball neck receptacle runs substantially horizontally when the motor vehicle is standing on a horizontal roadway.

25. The trailer device according to claim 1, wherein in the rest position a central axis of the ball neck receptacle runs substantially vertically when the motor vehicle is standing on a horizontal roadway.

26. The trailer device according to claim 1, wherein the pivot bearing unit enables a pivoting of the ball neck receiving body about a pivot axis.

27. The trailer device according to claim 26, wherein the pivot axis runs transversely to a vehicle longitudinal direction.

28. The trailer device according to claim 26, wherein the pivot axis runs parallel to the crossmember.

29. The trailer device according to claim 26, wherein the ball neck receiving body is pivotable about a pivot axis, wherein the pivot axis is a single pivot axis.

30. The trailer device according to claim 1, wherein a pivot axis of the pivot bearing unit, in the working position, lies, in the direction of the force of gravity, above a partial region of the ball neck receiving body adjacent to the insertion opening.

31. The trailer device according to claim 30, wherein the partial region extends starting from the insertion opening over at most half of the extent of the ball neck receiving body in the direction of the central axis.

32. The trailer device according to claim 1, wherein the pivot bearing unit comprises bearing elements arranged on the ball neck receiving body, which are mounted on side parts of the holding unit by means of a pivot bearing so as to be pivotable about a pivot axis.

33. The trailer device according to claim 1, wherein the holding unit comprises the pivot bearing unit, by means of which the ball neck receiving body is raisable from the working position, in which the ball neck is insertable into said receiving body for trailer operation, into the rest position, in which an insertion opening of the ball neck receiving body is arranged outside a field of view as a result of the raising of the ball neck receiving body.

34. The trailer device according to claim 1, wherein the ball neck receiving body is arranged higher in the rest position than in the working position, as considered in the direction of the force of gravity.

35. The trailer device according to claim 1, wherein the ball neck receiving body is arranged in front of a pivot axis in the rest position, as considered in the direction of forward travel of the motor vehicle.

36. The trailer device according to claim 1, wherein the ball neck receiving body, in the rest position and in the direction of the force of gravity, is arranged above a plane which extends parallel to a roadway through the central axis of the ball neck receptacle in the working position.

37. The trailer device according to claim 1, wherein in the rest position a region of the ball neck receiving body forming an insertion opening is the lowest region of said receiving body in the direction of the force of gravity.

38. The trailer device according to claim 1, wherein in the rest position an insertion opening of the ball neck receiving body faces towards a roadway.

39. The trailer device according to claim 1, wherein the ball neck receiving body, in the rest position, protrudes downwardly beyond the holding unit in the direction of the force of gravity by at most a quarter of the extent of said receiving body transverse to the central axis.

40. The trailer device according to claim 1, wherein the ball neck receiving body, in the rest position, is arranged on a side of a pivot axis facing towards the vehicle body.

41. The trailer device according to claim 1, wherein the ball neck receiving body, in the rest position, is arranged engaging in a receiving space of the holding unit.

42. The trailer device according to claim 41, wherein the receiving space is arranged between side parts of the holding unit.

43. The trailer device according to claim 1, wherein the ball neck receiving body, in the working position, is arranged below a pivot axis in the direction of the force of gravity.

44. The trailer device according to claim 43, wherein a first locking element has at least one swivel latch, which in the locking position fixes to a latch member forming a second locking element.

45. The trailer device according to claim 1, wherein the ball neck receiving body, in the working position, is arranged, in the direction of the force of gravity, below a plane defined by a lower edge of a bumper unit and parallel to a roadway.

46. The trailer device according to claim 1, wherein a locking device is provided, which fixes the ball neck receiving body in the rest position relative to the holding unit.

47. The trailer device according to claim 46, wherein the locking device comprises two locking elements, of which one is connected to the holding unit and one is connected to the ball neck receiving body.

48. The trailer device according to claim 1, wherein the pivot motion from the working position into the rest position is performed by manual operation.

49. The trailer device according to claim 1, wherein the pivot motion between the working position and the rest position is performed in a motor-driven manner.

50. A motor vehicle with a trailer device, wherein the trailer device is formed in accordance with claim 1.

51. The trailer device according to claim 1, wherein in the working position the insertion portion of the ball neck inserted into the ball neck receptacle is supported on the first support surface or a second support surface surface by means of a side facing towards the pivot bearing unit, in particular the pivot axis.

52. The trailer device according to claim 1, wherein the ball neck receiving body is U-shaped at least in part and has an open side, in which the first support surface or a second support surface lies in the working position of the ball neck receiving body.

* * * * *

UNITED STATES PATENT AND TRADEMARK OFFICE
CERTIFICATE OF CORRECTION

PATENT NO. : 10,717,332 B2
APPLICATION NO. : 15/492471
DATED : July 21, 2020
INVENTOR(S) : Wolfgang Gentner et al.

Page 1 of 1

It is certified that error appears in the above-identified patent and that said Letters Patent is hereby corrected as shown below:

In the Claims

Column 15 (Line 52) Claim 19, Line 4 incorrectly reads "support surface surface lie in the working position of the ball" but should read -- support surface lie in the working position of the ball --.

Signed and Sealed this
Fifteenth Day of September, 2020

Andrei Iancu
*Director of the United States Patent and Trademark Office*